United States Patent [19]
Cavero

[11] Patent Number: 4,868,704
[45] Date of Patent: Sep. 19, 1989

[54] APPARATUS FOR PROVIDING DISTANCE PROTECTION AND DISTANCE MEASUREMENT FOR A HIGH VOLTAGE TRANSMISSION LINE

[75] Inventor: Leonard P. Cavero, Media, Pa.

[73] Assignee: General Electric Company, King of Prussia, Pa.

[21] Appl. No.: 270,835

[22] Filed: Nov. 14, 1988

[51] Int. Cl.⁴ .............................................. H02H 3/16
[52] U.S. Cl. ...................................... 361/80; 361/63; 361/65; 361/78; 324/522; 364/483
[58] Field of Search ....................... 361/62, 63, 65, 78, 361/79, 80, 83, 86, 87; 324/522; 364/483, 492

[56] References Cited
U.S. PATENT DOCUMENTS 4,034,269 7/1977 Wilkinson .............................. 361/79
4,293,886 10/1981 Church et al. ..................... 361/62 X
4,405,966 9/1983 Cavero .................................. 361/80
4,420,788 12/1983 Wilkinson et al. ............... 361/80 X
4,686,601 8/1987 Alexander et al. ............... 361/80 X Primary Examiner—Derek S. Jennings
Attorney, Agent, or Firm—Henry J. Policinski; William H. Murray

[57] ABSTRACT a protective relay for detecting faults in electrical power distribution system generates a signal Δi(t) which is substantially equal to the magnitude of the power distribution system current i measured at a first time subtracted from the magnitude of the power distribution system current i measured at a second time, the second time occurring later than the first time. The signal Δi(t) is utilized to generate measurement of the distance of a fault to the relay and is also utilized to generate operate signals if the fault occurs within the zone protected by the relay.

15 Claims, 12 Drawing Sheets

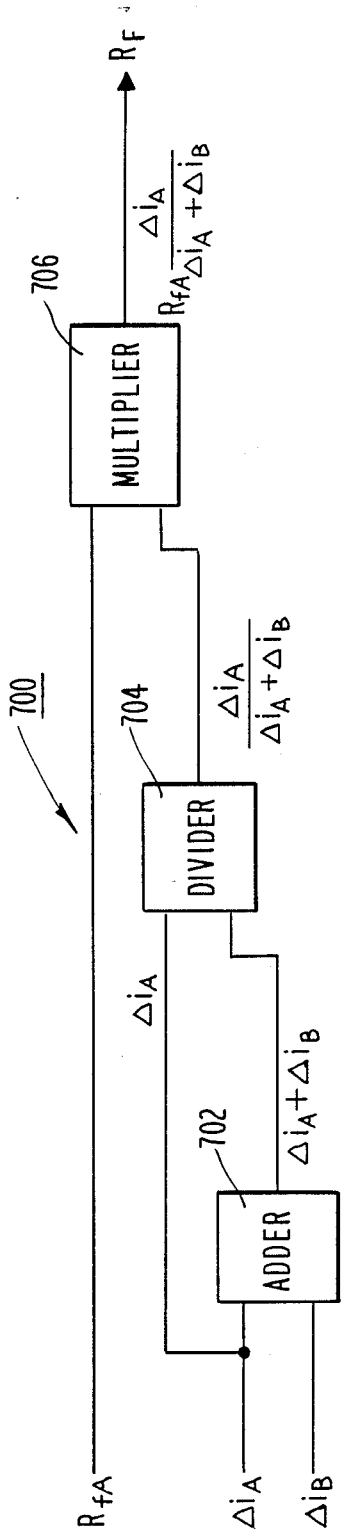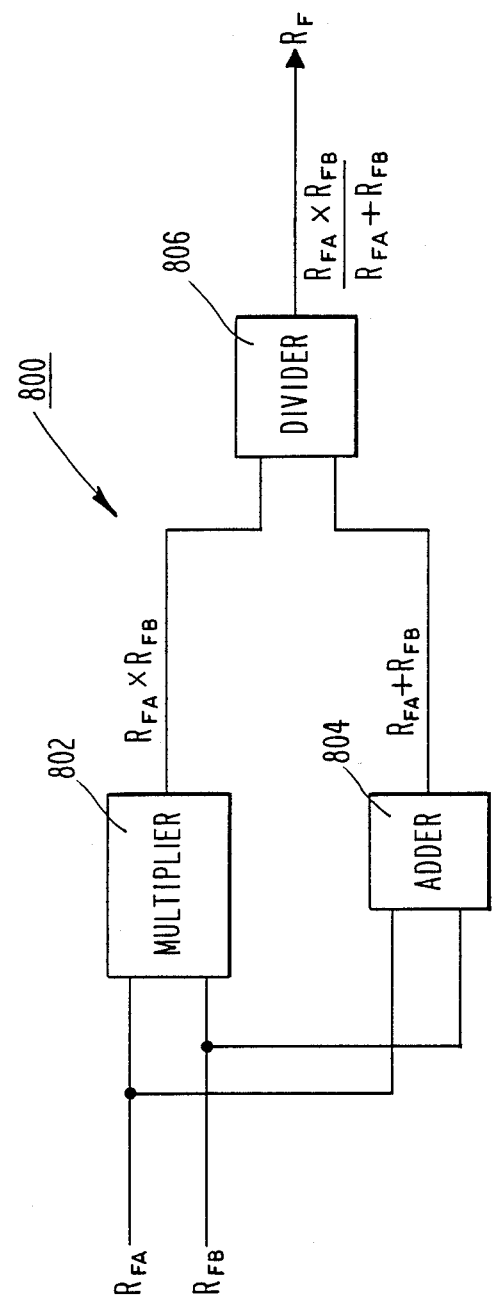

APPARATUS FOR PROVIDING DISTANCE PROTECTION AND DISTANCE MEASUREMENT FOR A HIGH VOLTAGE TRANSMISSION LINE

BACKGROUND OF THE INVENTION

The present invention relates to protective systems for use in AC electrical power distribution systems and more particularly to distance relays for AC electrical power transmission line protection.

Distance relays are well known in the art of protective relaying. For example, reference may be had to "The Art and Science of Protective Relaying", Mason, published by John Wiley and Son, Inc. (1956), particularly 115 to Chapter 14. Exemplary types of distance relays are disclosed in U.S. Pat. No. 4,034,269, issued to S. B. Wilkinson, on July 5, 1977; U.S. Pat. No. 4,420,788, issued to S. B. Wilkinson and G. E. Alexander on Dec. 13, 1983; and U.S. Pat. No. 4,405,966, issued to Leonardo Cavero, the inventor of the present invention, on Sept. 20, 1983. All these patents are assigned to the assignee of the present invention and are incorporated by reference in the present application as if fully set forth herein.

Distance relays are utilized in protective systems for AC power transmission lines to detect faults within protected zones or portions of the transmission lines. If such a fault is detected within the relay's zone or reach, the distance relay will enable operation of a circuit breaker in order to trip the faulted phase or phases.

Phase distance relays are utilized to detect phase to phase faults within a protected zone or portion of a transmission line. If such a fault is detected within the zone or reach of this type of distance relay, the phase distance relay will initiate a signal which will be used to cause the operation of a three pole circuit breaker to trip all three phases of the transmission line. This is to be contrasted with a ground distance relay which detects faults between a phase and ground, again within a designated zone or reach; and, upon detection of such a fault, generates a signal which enables the operation of a circuit breaker to trip the faulted phase only.

As indicated above, each particular distance relay should only detect faults within its protected zone or reach. The parameters of a distance relay are commonly selected to correspond to the parameters of the transmission line. For example, the parameters are selected to provide a forward reach that may correspond to the forward distance of the protected zone of transmission line under protection of the particular relay. It is desired that the distance relay operate within its selected forward reach thereby confining the protection of a particular distance relay to the selected zone within a protected system.

The desired operation of the distance relay may be hindered by the inability to distinguish between internal and external faults. Internal faults are hose which occur within the protected zone or reach of the relay, whereas external faults are those which occur outside the zone or relay reach. For example, errors in measuring fault resistance can cause the fault to appear further away from or closer to the distance relay location than it actually is; situations which, in the worse case, could prevent the operation of the distance relay on a fault occurring within its zone or reach, or could cause the relay to misoperate for a fault external to the protected zone or reach.

Although distance relays have, in the past, been used to detect faults within a predetermined protected zone or reach of the relay, such relays have not been able to provide a determination of the actual location of the fault; that is, the distance from the relay at which the fault occurred. The ability to determine the location of the fault in terms of distance from the relay enhances the utility of a distance relay.

Accordingly, it is an object of the present invention to provide a distance relay with improved discrimination between internal and external faults thereby increasing the reliability of the relay operation and the security of the protection system.

It is another object of the present invention to provide a distance relay for detecting faults in a protected zone of an AC electrical power transmission line, which relay determines the distance to the fault.

It is yet another object of the present invention to provide a distance relay with a capability for improved fault resistance determination.

It is a further object of the present invention to provide a distance relay which substantially eliminates the adverse effects on fault distance determination due to fault current components from multiple sources connected to the AC power transmission line.

It is still another object of the present invention to provide a distance relay which eliminates adverse effects of prefault load current on fault distance determination.

These and other objects of the present invention will become apparent to those skilled in the art upon consideration of the following description of the invention.

SUMMARY OF THE INVENTION

The present invention comprises a distance relay for detecting faults within a predetermined protected zone of an AC electrical power transmission line and for measuring the distance to detected faults. The distance relay includes means for detecting a fault current and subtracting prefault current therefrom.

The features of the invention believed to be novel, are set forth particularly in the appended claims. The invention itself, however, both as to its organization and operation, together with further objects and advantages thereof, may best be understood by reference to the following description in conjunction with the accompanying drawing figures.

BRIEF DESCRIPTION OF THE DRAWINGS

FIG. 14 is a block diagram of a preferred embodiment of a fault resistance measurement portion of the present invention.

FIG. 15 is a block diagram of an alternate preferred embodiment of a resistance measurement portion of the present invention.

DETAILED DESCRIPTION OF THE PREFERRED EMBODIMENT

Figure 1:
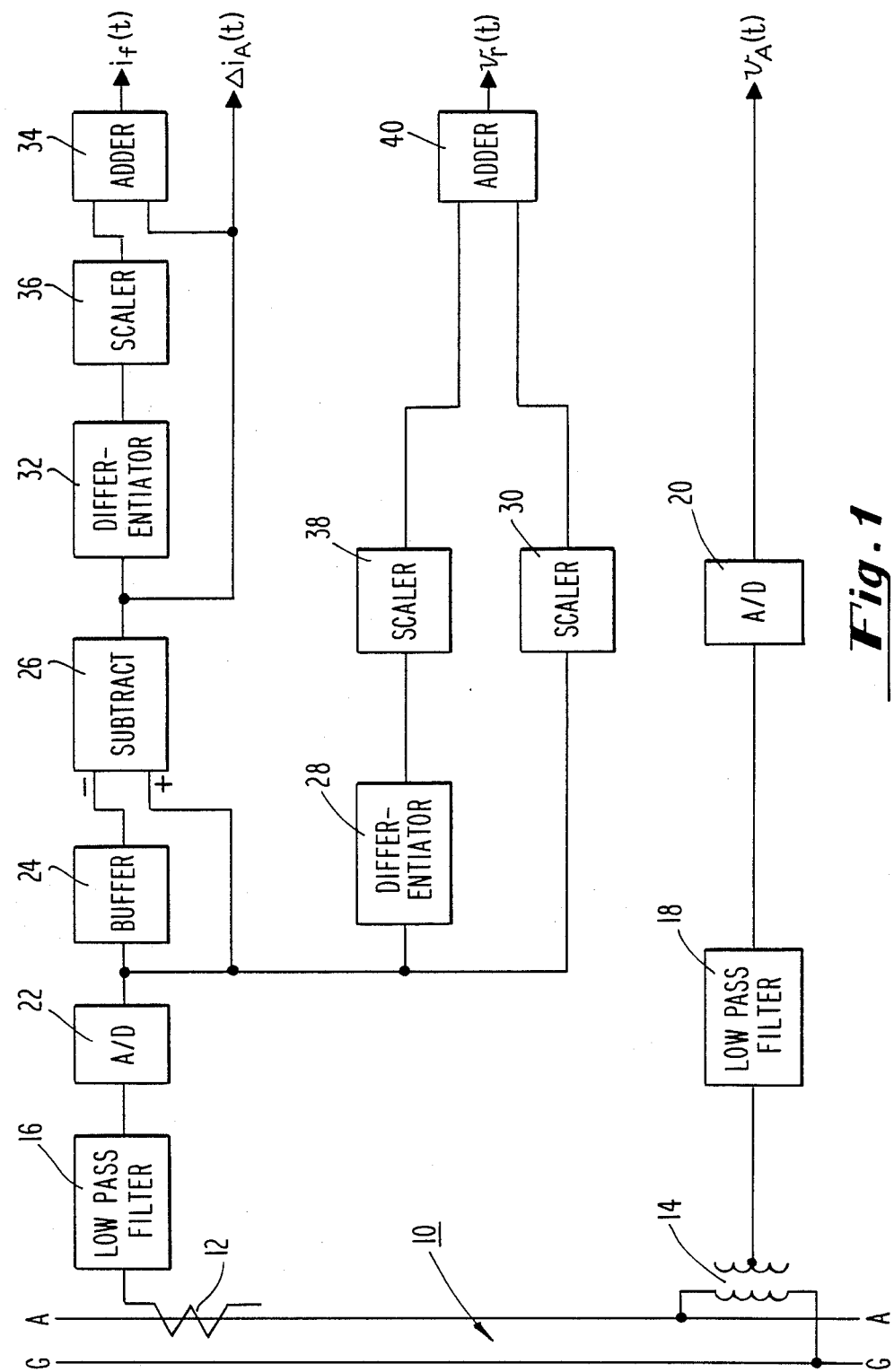
FIG. 1 is a one line, block diagram of a current and voltage processing portion of a preferred embodiment of the present invention.

Referring to FIG. 1, there is shown an alternating current electric power transmission line, generally designated 10. Although such alternating current electrical power transmission lines normally comprise three phases and ground, for purposes of simplicity and clarity, the following detailed description will be described with respect to the A phase (A) and ground (G). It should be understood that the following description also applies with respect to the B and the C phase, as well as relays connected between phases.

Associated with A phase is means 12 for sensing current in that phase as well as means 14 for sensing voltage on that phase. As is well known to those skilled in the protective relaying and power transmission art, current sensing means 12 may be a current transformer and voltage sensing means 14 may be a step down potential transformer. Also, a current sensing means may be associated with each phase as well as a separate voltage sensing means associated with each phase. However, it is to be understood that although a specific type of current and voltage sensing scheme is depicted in FIG. 1, other schemes known in the art may be substituted for that depicted; the purpose being to obtain signals which are related to each phase voltage and each phase current.

The output from the current sensing means 12, which is a signal $i_A(t)$ proportional to the current flowing in the A phase, is coupled to the input of a first low pass filter 16. The output of the voltage sensing means 14, which is a signal $v_A(t)$ proportional to the phase A to ground voltage, is coupled to the input of a second low pass filter 18. In the preferred embodiment, the first 16 and second 18 low pass filters each preferably have a frequency cut off of approximately 500 Hz in order to filter out transients and other spurious signals having frequencies which exceed 1 KHz, while passing, substantially unchanged, signals at the system frequency which is typically 50 Hz or 60 Hz. Consequently, the output signal $i_A(t)$ from the first filter 16 is the filtered input signal $i_A(t)$, and the output signal $v_A(t)$ from the second filter 18 is the filtered input signal $v_A(t)$.

The output $v_A(t)$ of the second low pass filter 18 is coupled to the input of a first analog to digital (A/D) converter 20. In the preferred embodiment, the first A/D converter 20 samples the magnitude of the input signal at a predetermined rate which i the preferred embodiment, is twenty samples per cycle in 50 Hz systems and sixteen samples per cycle in 60 Hz systems. The magnitude of each sample is converted into a digital signal having a value corresponding to such magnitude. Consequently, the output $v_A(t)$ of the first A/D converter 20 is a digitized version of the analog input signal.

The output of the first low pass filter 16 is coupembodiment, the second A/D converter 22 is of the same type and performs the same function as that previously described with respect to the first A/D converter 20. The output $i_A(t)$ of the second A/D converter 22, which is a digitized version of the input signal, is coupled to the input of a buffer 24, a positive input of a first digital subtraction circuit 26, the input of a first differentiator 28 and the input of a first scaler 30. In the preferred embodiment, the buffer 24 comprises a memory for storing the digitized input signal $i_A(t)$ for a time k/f where k is a predetermined constant and f is the system frequency, typically 50 Hz or 60 Hz. Accordingly, the output of the buffer 24 is the signal $i_A(t-k/f)$. When k=1, the output of the buffer 24 is equal to the magnitude of $i_A$ at a point one cycle prior to the input $i_A(t)$. In the preferred embodiment, the output $i_A(t-k/f)$ of buffer 24 is the input signal $i_A(t)$ which has been delayed five cycles at the fundamental system frequency; that is, 100 milliseconds in a 50 Hz system and 83.333 milliseconds in a 60 Hz system.

The output $i_A(t-k/f)$ of the buffer 24 is coupled to a negative input of the first digital subtraction circuit 26. In the preferred embodiment, the first digital subtraction circuit 26 is a circuit whose output is a digital signal $\Delta i_A(t)$ having a digital value equal to the magnitude of the digital value of the input signal applied to the positive input minus the value of the signal applied to the negative input. Since the signal $i_A(t)$ is applied to the positive input and the signal $i_A(t-k/f)$ is applied to the negative input, the output signal, $\Delta i_A(t)$ is equal to $i_A(t)-i_A(t-k/f)$. The output $\Delta i_A(t)$ of the digital subtraction circuit 26 is coupled to the input of a second differentiator 32 and one input of a first two-input adder 34. In the preferred embodiment, the first 28 and second 32 differentiators each measures and stores the magnitude of the input signal at a first time $t_1$ and again at a second time $t_3$, then subtracts the magnitude measured at $t_1$ from the magnitude measured at $t_3$ and divides the result by the magnitude of time $t_3$ minus time $t_1$. Consequently, the output of the second digital differentiator 32 is a signal $d\Delta i_A(t)/dt$ at a time $t_2$, having a value substantially equal to the differential, with respect to time, of the input signal $\Delta i_A(t)$.

The output of the second digital differentiator 32 is coupled to the input of a second scaler 36. The second scaler 36 is a circuit whose output is a digital signal having a magnitude equal to the input signal $d\Delta i_A(t)/dt$ multiplied by a predetermined scaler function which, in the preferred embodiment is $\tan \alpha/2\pi f$, where f is the fundamental system frequency, typically 50 Hz or 60 Hz, and $\tan \alpha$ is a quantity which is a function of the particular power system in which the distance relay of the present invention is used. Consequently the output of the second scaler 36 is $$\frac{d\Delta i_A(t)}{dt} \cdot \frac{\tan\alpha}{2\pi f}$$

The output of the second scaler 36 is coupled to the second input of the first two-input adder 34. The first two-input adder 34 is a circuit whose output is a digital signal $i_f(t)$ having a magnitude which is equal to the digital sum of the input signals which are $\Delta i_A(t)$ and $$\frac{d\Delta i_A(t)}{dt} \cdot \frac{\tan\alpha}{2\pi f}$$

Consequently, the output $i_f(f)$ of the first two-input adder 34 is equal to $$\Delta i_A(t) + d\frac{\Delta i_A(t)}{dt} \cdot \frac{\tan\alpha}{2\pi f}$$

The output of the first differentiator 28 is a digital signal $di_A(t)/dt$ whose magnitude is the differential respect to time of the input signal $i_A(t)$. The output $di_A(t)/dt$ of the first differentiator 28 is coupled to the input of a third scaler 38. The third scaler 38 is of the same type as that previously described with respect to the first 30 and second 36 scalers, having a digital output signal whose magnitude is equal to the input $di_A(t)/dt$ multiplied by a predetermined scaling function which, in the preferred embodiment, is L. Consequently, the output of the third scaler 38 is $Ldi_A(t)/dt$. The magnitude of L is selected to be substantially equal to the line inductance per mile of the particular power system in which the relay of the present invention is used. The output $Ldi_A(t)/dt$ of the third scaler 38 is coupled to one input of a second two input adder 40.

The output of the first scaler 30 is a digital signal whose magnitude is equal to the input signal $i_A(t)$ multiplied by a predetermined scaling function which, in the preferred embodiment, is R. Consequently, the output of the first scaler 30 is $Ri_A(t)$. The magnitude of R is selected to be substantially equal to the line resistance per mile of the particular power system in which the relay of the present invention is used. The output $Ri_A(t)$ of the first scaler 30 is coupled to the second input of the second two input adder 40. The second two input adder 40 is the same type as that previously described with respect to the first two input adder 34, having an output signal whose magnitude is equal to the sum of the inputs $Ri_A(t)$ and $Ldi_A(t)/dt$. Accordingly, $v_r(t)$ is equal to $$Ri_A(t) + \frac{Ldi_A(t)}{dt} .$$

Figure 2:
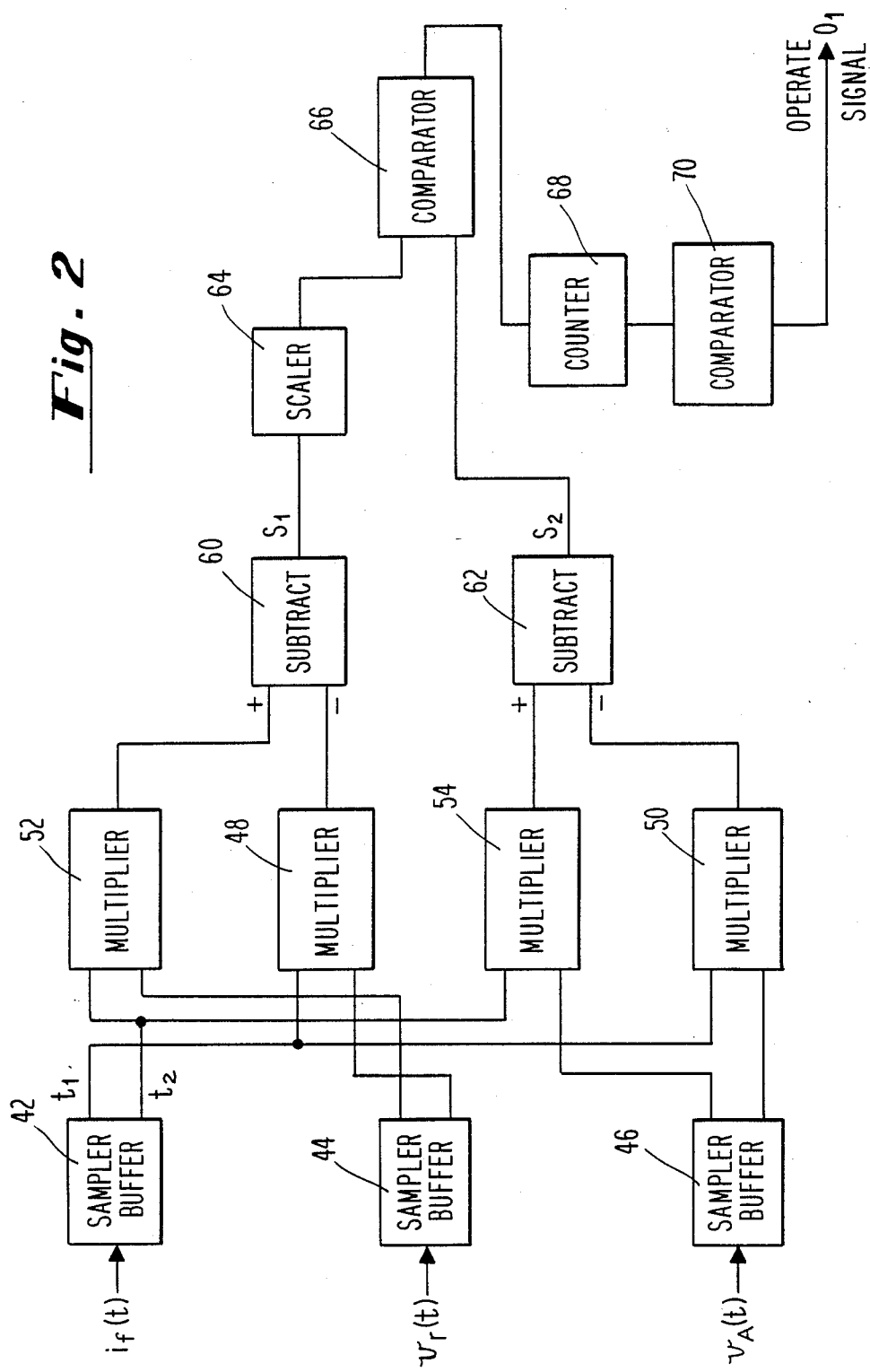
FIG. 2 is a block diagram of a first operate signal generation portion of the preferred embodiment of the present invention, utilizing voltage and current signals generated by that portion depicted in FIG. 1.

Referring now to FIG. 2, the output signal $i_f(t)$ from the first two-input adder 34 (see FIG. 1) is coupled to the input of the first sampler/buffer circuit 42. The output $v_r(t)$ from the second two-input adder 40 (see FIG. 1) is coupled to the input of a second sampler/buffer circuit 44. The output $v_A(t)$ of the first A/D converter 20 (see FIG. 1) is coupled to the input of a third sampler/buffer circuit 46. In the preferred embodiment, the first 42, second 44 and third 46 sampler/buffer circuits each have two outputs, the first of which is equal to the magnitude of the input signal sampled at a first time $t_1$, and the second of which is equal to the magnitude of the input signal sampled at a second time $t_2$. Consequently, the outputs of the first sampler/buffer circuit 42 is a first signal $i_f(t_1)$ which is the input signal $i_f(t)$ sampled at time $t_1$; and the second output is a signal $i_f(t_2)$ which is equal to the input signal $i_f(t)$ sampled at time $t_2$.

Similarly, the outputs of the second sampler/buffer circuit 44 comprise a first signal $v_r(t_1)$ which is equal to the input signal $v_r(t)$ sampled at the first time $t_1$; and a second signal $v_r(t_2)$ which is equal to the input signal $v_r(t)$ sampled at the second time $t_2$. The outputs of the third sampler/buffer circuit 46 comprise a first signal $v_A(t_1)$ which is equal to the input signal $v_A(t)$ sampled at the first time $t_1$; and a second signal $v_A(t_2)$ which is equal to the input signal $v_A(t)$ sampled at the second time $t_2$.

The output signal $i_f(t_1)$ from the first sampler/buffer circuit 42 is coupled to one input of a first two-input multiplier 48 and one input of a second two-input multiplier 50. The output signal $i_f(t_2)$ from the first sampler/buffer circuit 42 is coupled to one input of a third two-input multiplier 52 and one input of a fourth two-input multiplier 54. The output signal $v_r(t_1)$ from the second sampler/buffer circuit 44 is coupled to the second input of the third two-input multiplier 52. The output signal $v_r(t_2)$ from the second sampler/buffer circuit 44 is coupled to the second input of the first two-input multiplier 48. The output signal $v_A(t_1)$ from the third sampler/buffer circuit 46 is coupled to the second input of the fourth two-input multiplier 54. The output signal $v_A(t_2)$ from the third sampler/buffer circuit 46 is coupled to the second input of the second two-input multiplier 50.

In the preferred embodiment, the first 48, second 50, third 52 and fourth 54 two-input multipliers are each digital multipliers producing a digital output signal having a magnitude which is equal to the magnitude of the first input signal multiplied by the magnitude of the second input signal. Consequently, the output of the first multiplier 48 is the signal $v_r(t_2)i_f(t_1)$; the output of the second multiplier circuit 50 is the signal $v_A(t_2)i_f(t_1)$; the output of the third multiplier 52 is the signal $v_r(t_1)i_f(t_2)$; and the output of the fourth multiplier 54 is the signal vhd Al $(t_1)i_f(t_2)$.

The output of the first multiplier circuit 48 is coupled to a negative input of a second digital subtraction circuit 60. The output of the second multiplier circuit 50 is coupled to a negative input of a third digital subtraction circuit 62. The output of the third multiplier circuit 52 is coupled to a positive input of the second digital subtraction circuit 60 The output of the fourth multiplier circuit 54 is coupled to a positive input of the third digital subtraction circuit 62. In the preferred embodiment the second 60 and third 62 digital subtraction circuits are of the same type as the previously described first digital subtraction circuit 26, each producing a digital output signal whose magnitude is equal to the magnitude of the signal applied to the positive input minus the magnitude of the signal applied to the negative input. Consequently, the output of the second digital subtraction circuit 60 is the signal $S_1$ which is equal to $v_r(t_1)i_r(t_2) - v_r(t_2)i_r(t_1)$; and the output of the third digital subtraction circuit 26 is the signal $S_2$ which is equal to $v_A(t_1)i_r(t_2) - v_A(t_2)i_r(t_1)$.

The output signal $S_1$ from the second digital subtraction circuit 60 is coupled to the input of a fourth scaler circuit 64. The fourth scaler circuit 64 is preferably of the same type as that previously described with respect to the first 30, second 36 and third 38 scaler circuits, having an output which is equal to the input multiplied by a predetermined scaling function. In the preferred embodiment, the scaling function of the fourth scaler circuit 64 is the quantity $n_{set}$ which is a constant determined by the desired relay reach. Consequently, the output of the fourth scaler circuit 64 is the signal $$n_{set}\{v_r(t_1)i_r(t_2) - v_r(t_2)i_r(t_1)\}$$

or $n_{set}S_1$.

The output of the fourth scaler circuit 64 is coupled to a first input of a first two-input comparator circuit 66. The output of the third digital subtraction circuit 62 is coupled to a second input of the first two-input comparator circuit 66. The first two-input comparator circuit 66 is a digital comparator which generates an output signal when the magnitude of the signal applied to the first input exceeds the magnitude of the signal applied to the second input. Consequently, the first two-input comparator circuit 66 generates an output signal when the magnitude of the signal $n_{set}\{v_r(t_1)i_r(t_2) - v_r(t_2)i_r(t_1)\}$ exceeds the magnitude of the signal $$\{v_A(t_1)i_r(t_2) - v_A(t_2)i_r(t_1)\} \text{ or } n_{set}S_1 > S_2.$$

The output of the first two-input comparator circuit 66 is coupled to the input of a first counter 68. In the preferred embodiment, the first counter 68 provides a count signal upon receipt of a signal from the first two-input comparator circuit 66. The count signal is incremented by one count if the signal from the circuit 66 is present during the next succeeding sampling interval; otherwise, the count signal is reset to zero. The count signal is incremented by one count upon receipt of a signal from circuit 66 during each succeeding sampling interval. The count signal is reset to zero following any sampling interval during which a signal is not received from circuit 66.

The count signal from the first counter 68 is coupled to the input of a first comparator circuit 70. The first comparator circuit 70 generates an output signal $O_1$, which is a first operate signal in the preferred embodiment described herein, when the magnitude of the input signal exceeds a predetermined value. Consequently, the first comparator circuit 70 will generate the first operate signal $O_1$ when the magnitude of the count signal from the counter 68 exceeds a predetermined value, for example three in the preferred embodiment. This means that in the preferred embodiment, the first operate signal $O_1$ will be generated upon detection of a signal from the first two-input comparator circuit 66 during at least three consecutive sampling intervals.

Figure 3:
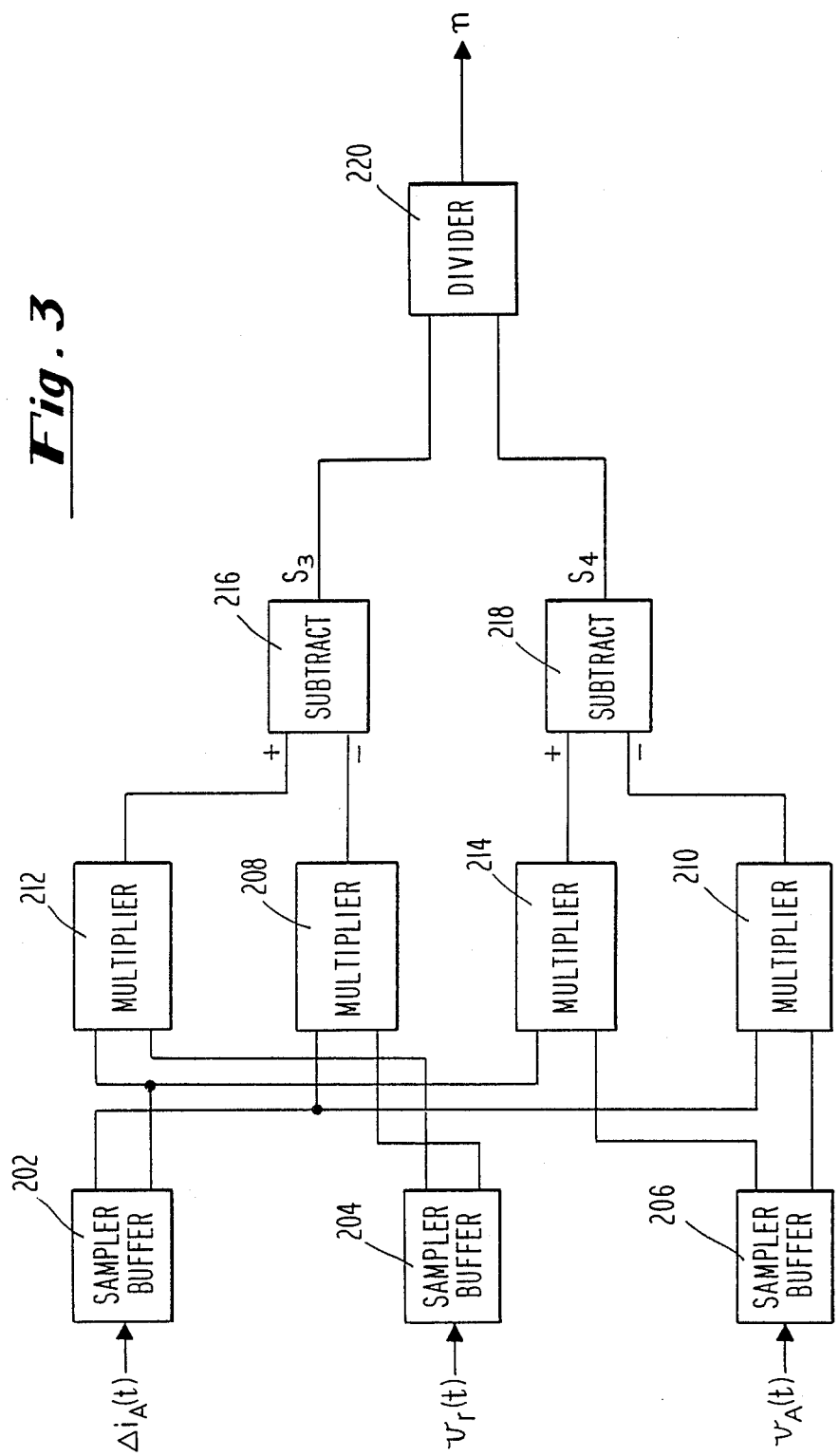
FIG. 3 is a block diagram of a distance measurement portion of the preferred embodiment of the present invention, utilizing voltage and current signals generated by the portion depicted in FIG. 1.

Referring now to FIG. 3, the output signal $\Delta i_A(t)$ from the first digital subtraction circuit 26 (see FIG. 1) is coupled to the input of a fourth sampler/buffer circuit 202. The output $V_r(t)$ from the second two input adder 40 (see FIG. 1) is coupled to the input of a fifth sampler/buffer circuit 204. The output $v_A(t)$ of the first A/D converter 20 (see FIG. 1) is coupled to the input of a sixth sampler/buffer circuit 206. In the preferred embodiment, the fourth 202, fifth 204 and sixth 206 sampler/buffer circuits are of the same type as the first 42, second 44 and third 46 sampler/buffer circuits previously described. Each has two outputs, the first of which is equal to the magnitude of the input signal sampled at the first time $t_1$, and the second of which is equal to the magnitude of the input signal sampled at the second time $t_2$. Consequently, the outputs of the fourth sampler/buffer circuit 202 is a first signal $\Delta i_A(t_1)$ which is the input signal $\Delta i_A(t)$ sampled at the first time $t_1$; and the second output is a signal $\Delta i_A(t_2)$ which is equal to the input signal $\Delta i_A(t)$ sampled at the second time $t_2$.

Similarly, the outputs of the fifth sampler/buffer circuit 204 comprise a first signal $V_r(t_1)$ which is equal to the input signal $V_r(t)$ sampled at the first time $t_1$; and a second signal $V_r(t_2)$ which is equal to the input signal $V_r(t)$ sampled at the second time $t_2$. The outputs of the sixth sampler/buffer circuit 206 comprise a first signal $v_A(t_1)$ which is equal to the input signal $v_A(t)$ sampled at the first time $t_1$; and a second signal $v_A(t_2)$ which is equal to the input signal $v_A(t)$ sampled at the second time $t_2$.

The signal $\Delta i_A(t_1)$ output from the fourth sampler/buffer circuit 202 is coupled to one input of a fifth two-input multiplier 208 and one input of a sixth two-input multiplier 210. The signal $\Delta i_A(t_2)$ output from the fourth sampler/buffer circuit 202 is coupled to one input of a seventh two-input multiplier 212 and one input of an eighth two-input multiplier 214. The $V_r(t_1)$ signal output from the fifth sampler/buffer circuit 204 is coupled to the second input of the seventh two-input multiplier 212. The signal $V_r(t_2)$ output from the fifth sampler/buffer circuit 204 is coupled to the second input of the fifth two-input multiplier 208. The signal $v_A(t_1)$ output from the sixth sampler/buffer circuit 206 is coupled to the second input of the eighth two-input multiplier 214. The signal $v_A(t_2)$ output from the sixth sampler/buffer circuit 206 is coupled to the second input of the sixth two-input multiplier 210.

In the preferred embodiment, the fifth 208, sixth 210, seventh 212 and eighth 214 two-input multipliers are the same type as the first 48, second 50, third 52 and fourth 54 two-input multipliers previously described. Each two-input multiplier produces a digital output signal having a magnitude which is equal to the magnitude of the first input signal multiplied by the magnitude of the second input signal Consequently, the output of the fifth multiplier 208 is the signal $V_r(t_2)\Delta i_A(t_1)$; the output of the sixth multiplier circuit 210 is the signal $v_A(t_2)\Delta i_A(t_1)$: the output of the seventh multiplier 212 is the signal $V_r(t_1)\Delta i_A(t_2)$; and the output of the eighth multiplier 214 is the signal $v_A(t_1)\Delta i_A(t_2)$.

The output of the fifth multiplier circuit 208 is connected to a negative input of a fourth digital subtraction circuit 216. The output of the sixth multiplier circuit 210 is coupled to a negative input of a fifth digital subtraction circuit 218. The output of the seventh multiplier circuit 212 is coupled to a positive input of the fourth digital subtraction circuit 216. The output of the eighth multiplier circuit 214 is coupled to a positive input of the fifth digital subtraction circuit 218. In the preferred embodiment, the fourth 216 and fifth 218 digital subtraction circuits are of the same type as the previously described first 26, second 60 and third 62 digital subtraction circuits, with each producing a digital output signal whose magnitude is equal to the magnitude of the signal applied to the positive input minus the magnitude of the signal applied to the negative input. Consequently, the output signal $S_3$ of the fourth digital subtraction circuit 216 is equal to $V_r(t_1)\Delta i_A(t_2) - V_r(t_2)\Delta i_A(t_1)$; and the output signal $S_4$ of the fifth digital subtraction circuit 218 is equal to $V_A(t_1)\Delta i_A(t_2) - V_A(t_2)\Delta i_A(t_1)$.

The output signal $S_3$ of the fourth digital subtraction circuit 216 is coupled to the divisor input of a digital divider circuit 220. The output signal $S_4$ of the fifth digital subtraction circuit 218 is coupled to a dividend input of the digital divider 220. The output n from the divider circuit 220 is a digital signal whose magnitude is equal to the quentin of the digital signal $S_4$ applied to the dividend input divided by the digital signal $S_3$ applied to the divisor input. The magnitude of the signal n is a function of the distance from the relay to the fault and is equal to $$\frac{V_A(t_1)\Delta i_A(t_2) - V_A(t_2)\Delta i_A(t_1)}{V_r(t_1)\Delta i_A(t_2) - V_r(t_2)\Delta i_A(t_1)} \text{ or } \frac{S_4}{S_3}.$$

Figure 4:
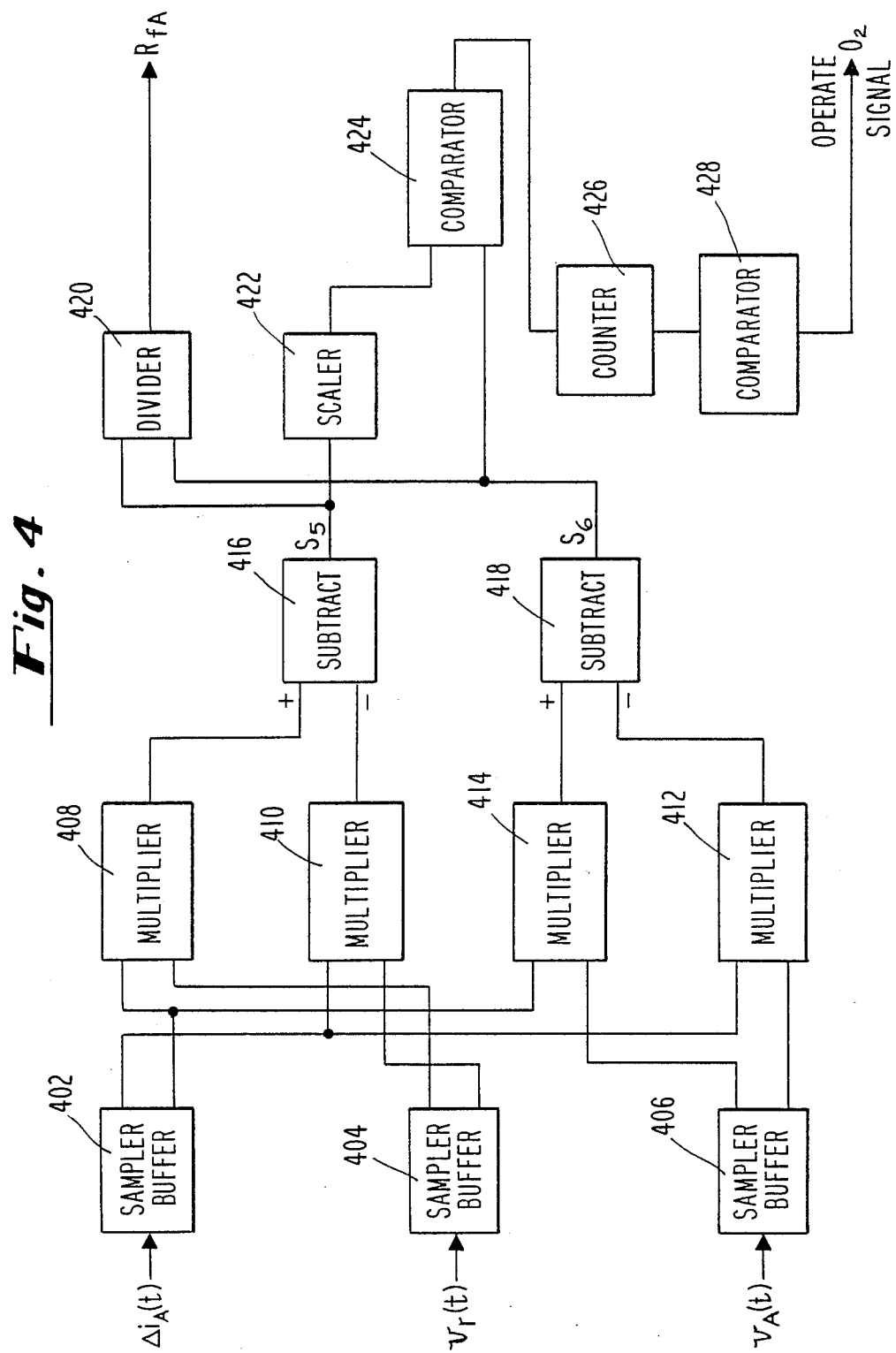
FIG. 4 is of a block diagram of a second operate signal generation portion of the preferred embodiment of the present invention, utilizing voltage and current signals generated by that portion depicted in FIG. 1.

Referring now to FIG. 4, the output signal $\Delta i_A(t)$ from the first digital subtraction circuit 26 (see FIG. 1) is coupled to the input of a seventh sampler/buffer circuit 402. The output $V_r(t)$ from the second two-input adder 40 (see FIG. 1) is coupled to the input of an eighth sampler/buffer circuit 404. The output $v_A(t)$ of the first A/D converter 20 (see FIG. 1) is coupled to the input of a ninth sampler/buffer circuit 406. In the preferred embodiment, the seventh 402, eighth 404 and ninth 406 sampler/buffer circuits are of the same type as the first 42, second 44, third 46, fourth 202, fifth 204 and sixth 206 sampler/buffer circuits previously described. Each has two outputs, the first of which is equal to the magnitude of the input signal sampled at the first time $t_1$, and the second of which is equal to the magnitude of the input signal sampled at the second time $t_2$. Consequently, the outputs of the seventh sampler/buffer circuit 402 is a first signal $\Delta i_A(t1)$ which is the input signal $\Delta i_A(t)$ sampled at the first time $t_1$; and the second output is a signal $\Delta i_A(t_2)$ Which is equal to the input signal $\Delta i_A(t)$ sampled at the second time $t_2$.

Similarly, the outputs of the eighth sampler/buffer circuit 404 comprises a first signal $V_r(t_1)$ which is equal to the input signal $V_r(t)$ sampled at the first time $t_1$; and a second signal $V_r(t_2)$ which is equal to the input signal $V_r(t)$ sampled at the second time $t_2$. The outputs of the ninth sampler/buffer circuit 406 comprises a first signal $v_A(t_1)$ which is equal to the input signal $v_A(t)$ sampled at the first time $t_1$; and a second signal $v_A(t_2)$ which is equal to the input signal $v_A(t)$ sampled at the second time $t_2$.

The signal $\Delta i_A(t_1)$ output from the seventh sampler/buffer circuit 402 is coupled to one input of a two-input multiplier 408. The signal $\Delta i_A(t_2)$ output from the seventh sampler/buffer circuit 402 is coupled to one input of a tenth two-input multiplier 410. The $V_r(t_1)$ signal output from the eighth sampler/buffer circuit 404 is coupled to the second input of the tenth two-input multiplier 410 and to one input of an eleventh two-input multiplier 412. The $V_r(t_2)$ signal output from the eighth sampler/buffer circuit 404 is coupled to a second input of the ninth two-input multiplier 408 and one input of a twelfth two-input multiplier 414. The $v_A(t_1)$ signal output from the ninth sampler/buffer circuit 406 is coupled to a second input of the twelfth two-input multiplier 414. The $v_A(t_2)$ signal output from the ninth sampler/buffer circuit 406 is coupled to a second input of the eleventh two-input multiplier 412.

In the preferred embodiment, the ninth 408, tenth 410, eleventh 412 and twelfth 414 two-input multipliers are the same type as the first 48 through eighth 214 two-input multipliers previously described. Each two-input multiplier produces a digital output signal having a magnitude which is equal to the magnitude of the first input signal multiplied by the magnitude of the second input signal. Consequently, the output of the ninth multiplier 408 is the signal $v_r(t_2)\Delta i_A(t_1)$; the output of the tenth multiplier 410 is the signal $v_r(t_1)\Delta i_A(t_2)$; the output of the eleventh multiplier 412 is the signal $v_A(t_2)v_r(t_1)$; and the output of the twelfth multiplier 414 is the signal $v_A(t_1)v_r(t_2)$.

The output of the ninth multiplier circuit 408 is connected to a positive input of a sixth digital subtraction circuit 416. The output of the tenth multiplier circuit 410 is coupled to a negative input of the sixth digital subtraction circuit 416. The output of the eleventh multiplier circuit 412 is coupled to a negative input of a seventh digital subtraction circuit 418. The output of the twelfth multiplier circuit 414 is coupled to the positive input the seventh digital subtraction circuit 418. In the preferred embodiment, the sixth 416 and seventh 418 digital subtraction circuits are of the same type as the previously described first 26, second 60, third 62, fourth 216 and fifth 218 digital subtraction circuits, with each providing a digital output signal whose magnitude is equal to the magnitude of the signal applied to the positive input minus the magnitude of the signal applied to the negative input. Consequently, the output signal $S_5$ of the sixth digital subtraction circuit 416 is equal to $v_r(t_2)\Delta i_A(t_1) - v_r(t_1)\Delta i_A(t_2)$; and the output signal $S_6$ of the seventh digital subtraction circuit 418 is equal to $v_A(t_1)V_r(t_2) - v_A(t_2)V_r(t_1)$.

The output signal $S_5$ of the sixth digital subtraction circuit 416 is coupled to the divisor input of a second digital divider circuit 420. The output signal $S_6$ of the seventh digital subtraction circuit 418 is coupled to a dividend input of the second digital divider 420. In the preferred embodiment, the second digital divider 420 is the same type as the previously described first digital divider circuit 220; having an output signal which is a digital signal whose magnitude is equal to the quotient of the digital signal $S_6$ applied to the dividend input divided by the digital signal $S_5$ applied to the divisor input. Consequently, the output $R_{fA}$ from the second divider circuit 420 is equal to $$\frac{\Delta i_A(t_1)V_r(t_2) - \Delta i_A(t_2)V_r(t_1)}{V_A(t_1)V_r(t_2) - v_A(t_2)V_r(t_1)} \text{ or } \frac{S_5}{S_6}.$$

The signal $R_{fA}$ is a function of the fault resistance; that is, the magnitude of $R_{fA}$ is proportional to the magnitude of the fault resistance measured at the relay location and the angle of the signal $R_{fA}$ is substantially equal to the fault resistance angle.

The output signal $S_5$ of the sixth digital subtraction circuit 416 is also coupled to the input of a fifth scaler circuit 422. The fifth scaler circuit 422 is preferably of the same type as that previously described with respect to the first 30, second 36, third 38 and fourth 64 scaler circuits, having an output which is equal to the input multiplied by a predetermined scaling function. In the preferred embodiment, the scaling function of the fifth scaler circuit 22 is the quantity $R_{SET}$ which is a constant determined by the desired relay reach. Consequently, the output of the fifth scaler circuit 222 is the signal $$R_{SET}[\Delta i_A(t_1)V_r(t_2) - \Delta i_A(t_2)V_r(t_1)] \text{ or }$$

$R_{SET}S_5$.

The output of the fifth scaler circuit 422 is coupled to a first input of a second two-input comparator circuit 424. The output signal $S_4$ of the seventh digital subtraction circuit 418 is coupled to a second input of the second two-input comparator circuit 424. The second two-input comparator circuit 424 is preferably of the same type as that previously described with respect to the first two-input comparator circuit 66 which generates an output signal when the magnitude of the signal applied to the first input exceeds the magnitude of the signal applied to the second input. Consequently, the second two-input comparator circuit 424 generates an output signal when the magnitude of the signal $$R_{SET}[\Delta i_A(t_1)V_r(t_2) - \Delta i_A(t_2)V_r(t_1)]$$

exceeds the magnitude of the signal $$[v_A(t_1)V_r(t_2) - v_A(t_2)V_r(t_1)]$$

or $R_{SET}S_5 > S_6$.

The output of the second two-input comparator circuit 424 is coupled to the input of a second counter 426. In the preferred embodiment, the second counter 426 is of the same type as that previously described with respect to the first counter 68 which provides a count signal upon receipt of a signal from the second two-input comparator circuit 424. The count signal is incremented by one count if the signal from the second two-input comparator circuit 424 is present during the next succeeding sampling interval; otherwise, the count signal is reset to zero. The count signal is incremented by one count upon receipt of a signal from the second two-input comparator circuit 424 during each succeeding sampling interval. The count signal is reset to zero following any sampling interval during which a signal is not received from the circuit 424.

The count signal from the second counter 426 is coupled to the input of a second comparator circuit 428. The second comparator circuit 428 is preferably of the same type as that previously described with respect to the first comparator circuit 70 which generates an output signal $O_2$, which is a second operate signal in the preferred embodiment, when the magnitude of the input signal exceeds a predetermined value. Consequently, the second comparator circuit 428 will generate the second operate signal $O_2$ when the magnitude of the count signal exceeds a predetermined value, for example 3 in the preferred embodiment. This means that in the preferred embodiment, the second operate signal $O_2$ will be generated upon detection of a signal from the second two-input comparator circuit 424 during at least three consecutive sampling intervals.

Figure 5:
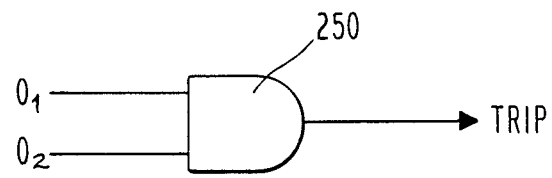
FIG. 5 is a block diagram of a trip signal generation portion of the preferred embodiment of the present invention, utilizing the first and second operate signals generated by that portion depicted in FIGS. 2 and 4 respectively.

Referring now to FIG. 5, the first operate signal $O_1$ is coupled to the first input of a two-input AND gate 250 and the second operate signal $O_2$ is coupled to the second input of the two-input AND gate 250. The output of the two-input AND gate 250 is a trip signal which is generated upon coincidence of the first operate signal $O_1$ and the second operate signal $O_2$. The trip signal is preferably utilized to enable the operation of a circuit breaker or other transmission line interruption means.

The preferred embodiment of the apparatus for providing distance protection and distance measurement for a high voltage transmission line, as depicted in FIGS. 1, 2, 3, 4 and 5, operates as follows. When there is no fault on the line, and the load remains substantially constant, the signal $$i_A\left(t - \frac{k}{f}\right)$$

is equal to the signal $i_A(t)$. Consequently, the output $\Delta i_A(t)$ from the first subtract circuit 26 is equal to 0. As a result, the signal $i_r(t)$ output from the first two-input adder 34 is also equal to 0. Accordingly, the output signal $i_r(t_1)$ and $i_r(t_2)$ from the first sampler/buffer circuit 42 are also 0. Therefore, the output signals from the first 48, second 50, third 52 and fourth 54 multipliers are 0 which means that the input signals to the first comparator 66 are 0 as well. Since both input signals are 0, the first comparator 66 will not produce an output signal which thus precludes the generation of the first operate signal $O_1$ from the output of the first comparator 70.

Since the output $\Delta i_A(t)$ from the first subtract circuit 26 is equal to 0, the output signals $\Delta i_A(t_1)$ and $\Delta i_A(t_2)$ from the seventh sampler/buffer circuit 402 are also 0. Therefore, the output signals from the ninth 408 and tenth 410 multipliers are 0 which means that the output signal $S_3$ from the sixth subtract circuit 416 is 0 as well. Since $S_3$ is 0, the output $R_{SET}$ from the fifth scaler circuit 422 is also 0. As indicated previously, the second two-input comparator circuit 424 will generate an output when $R_{SET}S_3 > S_4$. Since $R_{SET}S_3$ is 0, the second comparator 224 will not produce an output signal which thus precludes the generation of the second operate signal $O_2$ from the output of the second comparator 228. Since the generation of the first output signal $O_1$ and the second output signal $O_2$ is precluded, the AND gate 250 will not produce a trip signal.

Assuming now a fault on phase A, the output $\Delta i_A(t)$ from the first subtract circuit 26 will now be equal to the fault current since the output of subtract circuit 26 is the total postfault current (i.e. load current plus fault current) minus the prefault current (load current) occurring at h/f second prior to the occurrence of the fault. Since $\Delta i_A(t)$ is no longer zero, the comparator 66 will generate an output signal when $$n_{set}[V_r(t_1)i_r(t_2) - V_r(t_2)i_r(t_1)] > [V_A(t_1)i_r(t_2) - VA(t-2)i_r(t_1)]$$

or $n_{set}S_1 > S_2$. This means that the A phase fault of this example has occurred within the relay reach as set by the value of the constant $n_{SET}$ as previously described.

Similarly, the second two-input comparator 424 will generate an output signal when $R_{SET}S_3 > S_4$. This means that the A phase fault of this example has occurred within the resistance reach of the relay as set by the value of the constant $R_{SET}$ as previously described. Since a A phase fault has been assumed, the output signal from the first two-input comparator 66 and the output signal from the second two-input comparator 424 will each remain during the three consecutive sampling intervals; consequently, the first 70 and second 428 comparators will generate operate signals $O_1$ and $O_2$ respectively. The requirement that the two-input comparator output signals remain during consecutive sampling intervals is to ensure that an operate signal is generated only for actual faults and is not based on transient or spurious signals.

Since a phase A fault has been assumed in this example, the output signals $O_1$ and $O_2$ from the first 70 and second 428 comparators will be generated concurrently. Consequently, the AND gate 250 depicted in FIG. 5, will generate a trip signal which is utilized by the protection system to trip circuit breakers thereby isolating the faulted phase Also, since $\Delta i_A(t)$ is no longer zero, the divider circuit 220 (see FIG. 3) will generate a signal n which is a function of the distance from the relay to the fault and which is equal to $$\frac{S_2}{S_1} \text{ or } \frac{v_A(t_1)\Delta i_A(t_2) - v_A(t_2)\Delta i_A(t_1)}{v_r(t_1)\Delta i_A(t_2) - v_r(t_2)\Delta i_A(t_1)}.$$

Similarly, since $\Delta i_A(t)$ is no longer 0, the second divider circuit 420 (see FIG. 4) will generate a signal $R_{fA}$ which is a function of the fault resistance and which is equal to $$\frac{S_4}{S_3} \text{ or } \frac{v_A(t_1)V_r(t_2) - v_A(t_2)V_r(t_1)}{\Delta i_A(t_1)V_r(t_2) - \Delta i_A(t_2)V_r(t_1)}.$$

When there is no fault on the line, but the load current changes, the signal $\Delta i_A(t)$ will be equal to the magnitude of the change in load current since the output of the subtract circuit 26 is proportional to the post-load change current minus the pre-load change current. However, the $n_{SET}$ and $R_{SET}$ constants have been selected to ensure that there will be no output from the first 66 and second 424 two-input comparators for changes in load currents which are not due to faults within the reach of the relay. This can best be explained by reference to FIG. 6 which depicts the relay characteristic plotted on an L-R diagram As can be seen, when $n_{SET}[v_r(t_1)i_r(t_2) - v_r(t_2)i_r(t_1)][v_A(t_1)i_r(t_2) - v_A(t_2)i_r(t_1)]$ and $R_{SET}[v_r(t_1)\Delta i_A(t_2) - v_r(t_2)\Delta i_A(t_1)] > [v_A(t_1)\Delta i_A(t_2) - v_A(t_2)\Delta i_A(t_1)]$ the relay will not operate since that load characteristic falls within the zone of operation as shown in FIG. 6

Figure 6:
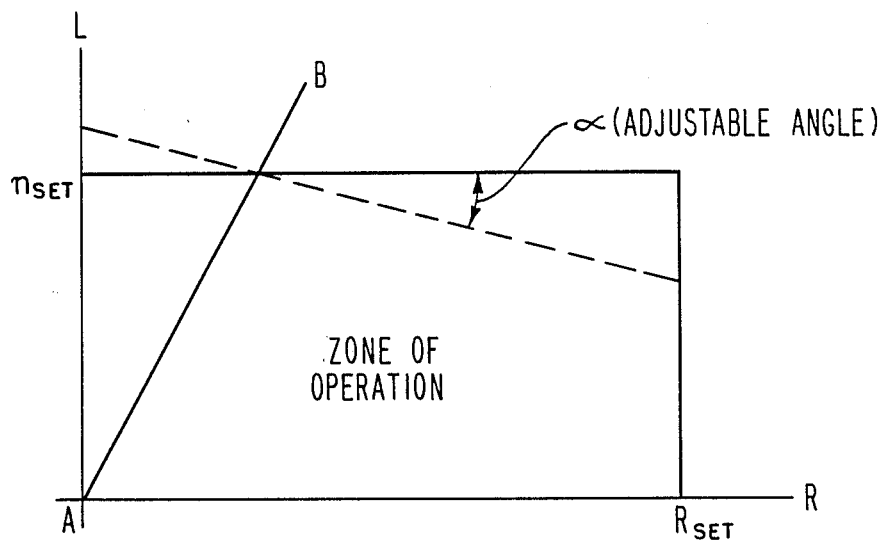
FIG. 6 depicts the characteristic of the preferred embodiment of the relay of the present invention plotted on an L-R diagram.

When
$n_{SET}[v_r(t_1)i_r(t_2) - v_r(t_2)i_r(t_1)][v_A(t_1)i_r(t_2) - v_A(t_2)i_r(t_1)]$ and $R_{SET}[v_r(t_2)\Delta i_A(t_1) - v_r(t_1)\Delta i_A(t_2)] > v_A(t_1)V_r(t_2) - v_A(t_2)V_r(t_1)]$ the relay will not operate since the load current falls outside of the zone of operation shown in FIG. 6.

As can be seen from the diagram of FIG. 6, $n_{SET}$ line can be tilted (see dotted line) in order to provide a slope to the relay reach. This tilt angle $\alpha$ is adjustable as provided by the differentiator 32 and scaler 36 of FIG. 1 where is scale function of the scaler 36 is $\tan \alpha / 2\pi f$.

Figure 7:
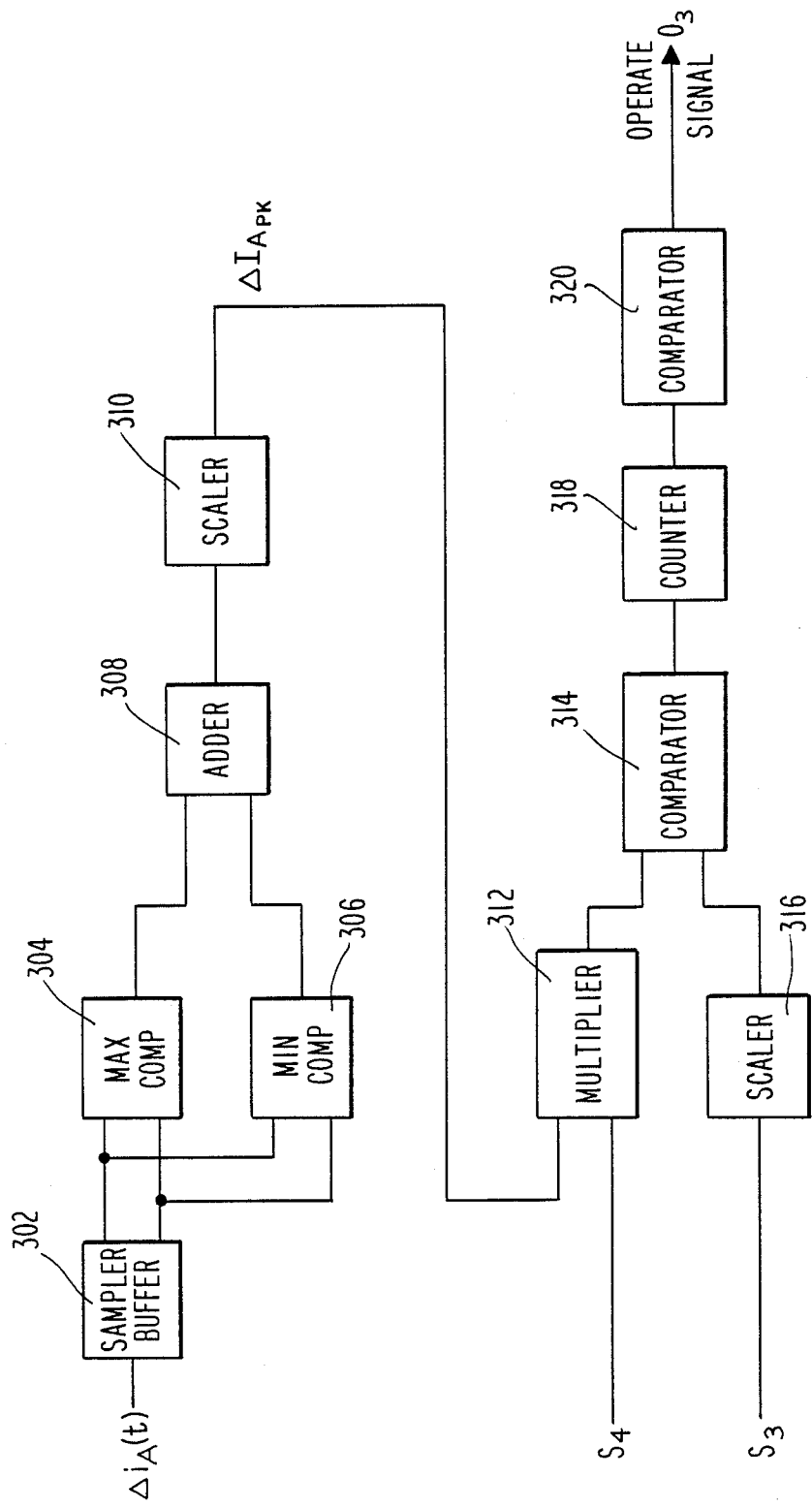
FIG. 7 is a block diagram of a third operate signal generation portion of the preferred embodiment of the present invention, utilizing a delta current signal generated by that portion depicted in FIG. 1 and signals generated by the second operate signal generation portion depicted in FIG. 4.

Referring now to FIG. 7, there is shown a block diagram of a variable resistance reach portion of the apparatus of the present invention The output signal $\Delta i_A(t)$ from the first digital subtraction circuit 26 (see FIG. 1) is coupled to the input of a tenth sampler/buffer circuit 302. The tenth sampler/buffer circuit 302 is of the same type as the previously described first 42 through ninth 406 sampler/buffer circuits. Accordingly, the tenth sampler/buffer circuit 302 has two outputs, the first of which is equal to the magnitude of the input signal sampled at the first time $t_1$, and the second of which is equal to the magnitude of the input signal sampled at the second time $t_2$. Consequently, the outputs of the tenth sampler/buffer circuit 302 is a first signal $\Delta i_A(t_1)$ which is the input signal $\Delta i_A(t)$ sampled at the first time $t_1$; and the second output is a signal $\Delta i_A(t_2)$ which is equal to the input signal $\Delta i_A(t)$ sampled at the second time $t_2$.

The output signal $\Delta i_A(t_1)$ from the tenth sampler/buffer circuit 302 is coupled to one input of a maximum computation circuit 304 and one input of a minimum computation circuit 306. The output signal $\Delta i_A(t_2)$ from the tenth sampler/buffer circuit 302 is coupled to a second input of the maximum computation circuit 304 and a second input of the minimum computation circuit 306. The maximum computation circuit 304 is a circuit which compares the magnitude of the two-input signals and provides an output signal which is equal to the maximum value of the two compared input signals. Consequently, the output signal from the maximum computation circuit 304 is the signal $\Delta i_A(t)MAX$. The minimum computation circuit 306 is a circuit which compares the magnitudes of the two-input signals and provides an output which is equal to the minimum of the input signals. Consequently, the output of the minimum computation circuit 306 is the signal $\Delta i_A(t)MIN$.

The output signal $\Delta i_A(t)MAX$ from the maximum computation circuit 304 is coupled to one input of a third two-input adder 308. The output signal $\Delta i_A(t)MIN$ is coupled to the second input of the third two-input adder 308. The third two-input adder 308 is preferably the same type as the previously described first 34 and second 42 two-input adders. Accordingly, the output of the third two-input adder 308 is a signal having a magnitude which is substantially equal to the sum of the magnitudes of the two input signals. Consequently, the output of the third two-input adder 308 is the signal $2\Delta I_A pk$. The output signal $2\Delta I_A pk$ from the third two-input adder 308 is coupled to the input of a sixth scaler circuit 310. The sixth scaler circuit 310 is the same type as the previously described first 3, second 36, third 38, fourth 64 and fifth 422 scaler circuits. Accordingly, the sixth scaler circuit 310 has an output which is equal to the input multiplied by a predetermined scaling function. In the preferred embodiment, the scaling function of the sixth scaler circuit 310 is the quantity 0.5; consequently, the output of the sixth scaler circuit 310 is the signal $\Delta I_A pk$, which is coupled to one input of a thirteenth two-input multiplier 312.

The thirteenth two-input multiplier 312 is preferably the same type as the first 48 through twelfth 414 two-input multipliers previously described Accordingly, the thirteenth two-input multiplier 312 produces a digital output signal having a magnitude which is equal to the magnitude of the first input signal multiplied by the magnitude of the second input signal. The output signal $S_4$ from the fifth digital subtraction circuit 218 (see FIG. 3) is coupled to the second input of the thirteenth two-input multiplier 312. Consequently, the output signal from the thirteenth two-input multiplier 312 is the signal $\Delta I_A pk S_4$. The output signal $\Delta I_A pk S_2$ from the thirteenth multiplier 312 is coupled to one input of a third two-input comparator circuit 314.

The output signal S₃ from the fourth digital subtraction circuit 216 (see FIG. 3) is coupled to the input of a seventh scaler circuit 316. The seventh scaler circuit 316 is preferably the same type as that previously described with respect to the first 30, second 36, third 38, fourth 64, fifth 222 and sixth 310 scaler circuits, having an output which is equal to the input multiplied by a predetermined scaling function In the preferred embodiment, the scaling function of the seventh scaler circuit 316 is the quantity $V_{SET}$ which is a constant determined by the desired relay reach. Consequently, the output of the seventh scaler circuit 316 is the signal $V_{SET}S_3$, which is coupled to the second input of the third two-input comparator circuit 314.

The third two-input comparator circuit 314 is preferably the same type as that previously described with respect to the first 66 and second 424 two-input comparator circuits, each of which generates an output signal when the magnitude of the signal applied to the first input exceeds the magnitude of the signal applied to the second input. Consequently, the third two-input comparator circuit 314 generates an output signal when the magnitude of the signal $V_{SET}S_3 > \Delta I_{Apk}S_4$. Since signal S₃ is equal to $[v_r(t_1)\Delta i_A(t_2) - v_r(t_2)\Delta i_A(t_1)]$ and signal S₄ is equal to $[v_A(t_1)\Delta i_A(t_2) - v_A(t_2)\Delta i_A(t_1)]$, the third comparator 314 will generate an output signal when $$V_{SET}[v_r(t_1)\Delta i_A(t_2) - v_r(t_2)\Delta i_A(t_1)] > \Delta I_{Apk}[v_A(t_1)\Delta i_A(t_2) - v_A(t_2)\Delta i_A(t_1)].$$

The output signal from the third two-input comparator circuit 314 is coupled to the input of a third counter 318. In the preferred embodiment, the third counter 318 is the same type as that previously described with respect to the first 68 and second 426 counters each of which provides a count signal upon receipt of a signal from their respect two-input comparator circuits. Accordingly, the output count signal is incremented by one count if the signal from the third two-input comparator circuit 314 is present during the next succeeding sampling interval; otherwise, the output count signal is reset to 0. The output count signal is incremented by one count upon receipt of a signal from the third two-input comparator circuit 314 during each succeeding sampling interval. The count signal is reset to 0 following any sampling interval during which the signal is not received from the comparator circuit 314.

The output count signal from the third counter 318 is coupled to the input of third comparator circuit 320. The third comparator circuit 320 is preferably the same type as that previously described with respect to the first 70 and second 428 comparator circuits each of which generates an output signal when the magnitude of the input signal exceeds a predetermined value. Accordingly, the third comparator 320 will generate an output signal O₃, which is a third operate signal in the preferred embodiment, when the magnitude of the input signal exceeds a predetermined value, for example 3, in the preferred embodiment. This means that in the preferred embodiment, the third operate signal O₃ will be generated upon detection of a signal from the third two-input comparator circuit 314 during at least three consecutive sampling intervals.

The third operate signal O₃, since it is generated when $\Delta I_{Apk}R_{FA} < V_{SET}$ (relay setting), where $\Delta I_{Apk}$ is the peak value of $\Delta I_A$, gives the relay a variable reach characteristic along the resistive axis similar to that obtained with a variable MHO characteristic. Consequently, the optimum relay tripping characteristic is preferably a combination of the following criteria:

$R_{FA} < R_{SET1}$ (minimum $R_F$ reach)

$\Delta I_{Apk}R_{FA} < V_{SET}$ (variable R reach)

$R_{FA} < R_{SET2}$ (maximum $R_F$ reach)

} AND } OR → TRIP

This is implemented by coupling the third operate signal O₃ to one input of an AND gate and coupling O₂ MAX (the second operate signal O₂ adjusted for maximum $R_F$ reach) to the other input of the two-input AND gate. The output of the two-input AND gate is coupled to one input of a two-input oR gate. The signal O₂ MIN ($R_{SET}$ set for minimum $R_F$ reach) is coupled to the other input of the two-input OR gate. The output of the two-input OR gate is coupled to the second input of the two-input AND gate 250 depicted in FIG. 5 with the first operate signal O₁ being coupled to the first input of AND gate 250 as shown in FIG. 5.

Referring to FIG. 14, there is shown a block diagram of a preferred embodiment of a fault resistance $R_f$ measurement portion generally designated 700, of the present invention. The resistance measurement portion 700 comprises an adder 702 having a first input and a second input. The signal $\Delta i_A$, which is generated as shown in FIG. 1, is coupled to the first input of the adder 702. A signal $\Delta i_B$, which is generated by a relay in accordance with the present invention, and particularly is described in FIG. 1, which relay is located in second position B remote from the position A of a first relay as described herein, is coupled to the second input of the adder 702. In a preferred use environment a first distance relay in accordance with the present invention is located a first position A and a second distance relay, in accordance with the present invention is located a second position B with the protected zone being defined by the transmission line located between positions A and B.

The adder 702 is preferably of the same type as that previously described with respect to the first two input adder 34, and having an output signal whose magnitude is equal to the sum of the input $\Delta i_A$ and $\Delta i_B$. Accordingly, the output of the adder 702 is equal to $\Delta i_A + \Delta i_B$.

The output from the adder 702 is coupled to a divisor input of a divider 704. The $\Delta i_A$ signal is coupled to the dividend input of the divider 704. In a preferred embodiment, the divider 704 is the same type as the previously described first digital divider circuit 20; having an output signal whose magnitude is equal to the quotient of the signal $\Delta i_B$ applied to the divisor input $\Delta i_A + \Delta i_B$ applied to the divisor input. Consequently, the output signal from the divider circuit 704 is substantially equal to $$\frac{\Delta i_A}{\Delta i_A + \Delta i_B}$$

The output of the divider circuit 704 is coupled to one input of a two input multiplier circuit 706. The signal $R_{fA}$, which is generated as previously described in connection with FIG. 4, is coupled to the second input of the two input multiplier 706. In the preferred embodiment, the two input multiplier 706 is the same type as the first two input multiplier 48 previously described;

having an output signal whose magnitude is equal to the magnitude of the first input signal $$\frac{\Delta i_A}{\Delta i_A + \Delta i_B}$$

multiplied by the magnitude of the second input signal $R_{fA}$. Consequently, the output Rf of the two input multiplier circuit 706 is equal to $$R_{fA} \frac{\Delta i_A}{\Delta i_A + \Delta i_B}$$

The signal $R_F$ is a function of the fault resistance recurring at the fault location; that is, the magnitude of $R_f$ is proportional to the magnitude of the fault resistance measured at the fault location and the angle of the signal $R_F$ is substantially equal to the fault resistance angle. As previously described the magnitude of the signal $R_{fA}$ is proportional to the magnitude of the fault resistance measured at the relay location and the angle of the signal $R_{fA}$ is substantially equal to the fault resistance angle.

Referring now to FIG. 15, there is shown a block diagram of an alternate preferred embodiment of the resistance measurement portion, generally designated 800, of the present invention. The fault resistance measurement portion 800 comprises a two input multiplier 802 and a two input adder 804. The signal $R_{fA}$ generated as previously described with respect to FIG. 4, is coupled to one input of the two input multiplier 802 and one input of the two input adder 804. A signal $R_{fB}$ generated by the relay located at position B, is coupled to the second input of the two input multiplier 802 and the second input multiplier adder 804. The signal $R_{fB}$ is generated in the same manner as previously described with respect to FIG. 4 for the signal $R_{fA}$. In the preferred embodiment, the two input multiplier 802 is the same type as the previously described two input multiplier 48, which produces an output signal having a magnitude which is equal to the magnitude of the signal $R_{fA}$ applied to the first input multiplied by the signal $R_{fB}$ applied to the second input. Consequently, the output of the two input multiplier 802 is the signal $R_{fA} \times R_{fB}$. The second adder 804 is preferably the same type as the previously described two input adder 34, having an output signal whose magnitude is equal to the sum of the signal $R_{fA}$ applied to the first input plus the signal $R_{fB}$ applied to the second input. Accordingly, the output of the two input adder 804 is the signal $R_{fA} + R_{fB}$, which signal is coupled to the divisor input of a divider 806. The output of the multiplier, $R_{fA} \times R_{fB}$ is coupled to the dividend input of the divider 806. The divider 806 is preferably the same type as the previously described divisor 220 having an output $R_F$, which is equal to the signal $R_{fA} \times R_{fB}$ applied to the dividend input divided by the signal $R_{fA} + R_{fB}$ applied to the divisor input. Consequently, the output $R_F$ of the divider 806 is equal to $$\frac{R_{fA} \times R_{fB}}{R_{fA} + R_{fB}}$$

the signal $R_F$ is a function of the actual fault resistance; as previously described; that is, the magnitude of $R_F$ is proportional to the magnitude of the fault resistance measured at the fault location, and the angle of the signal $R_F$ is substantially equal to the fault resistance angle.

Figure 8:
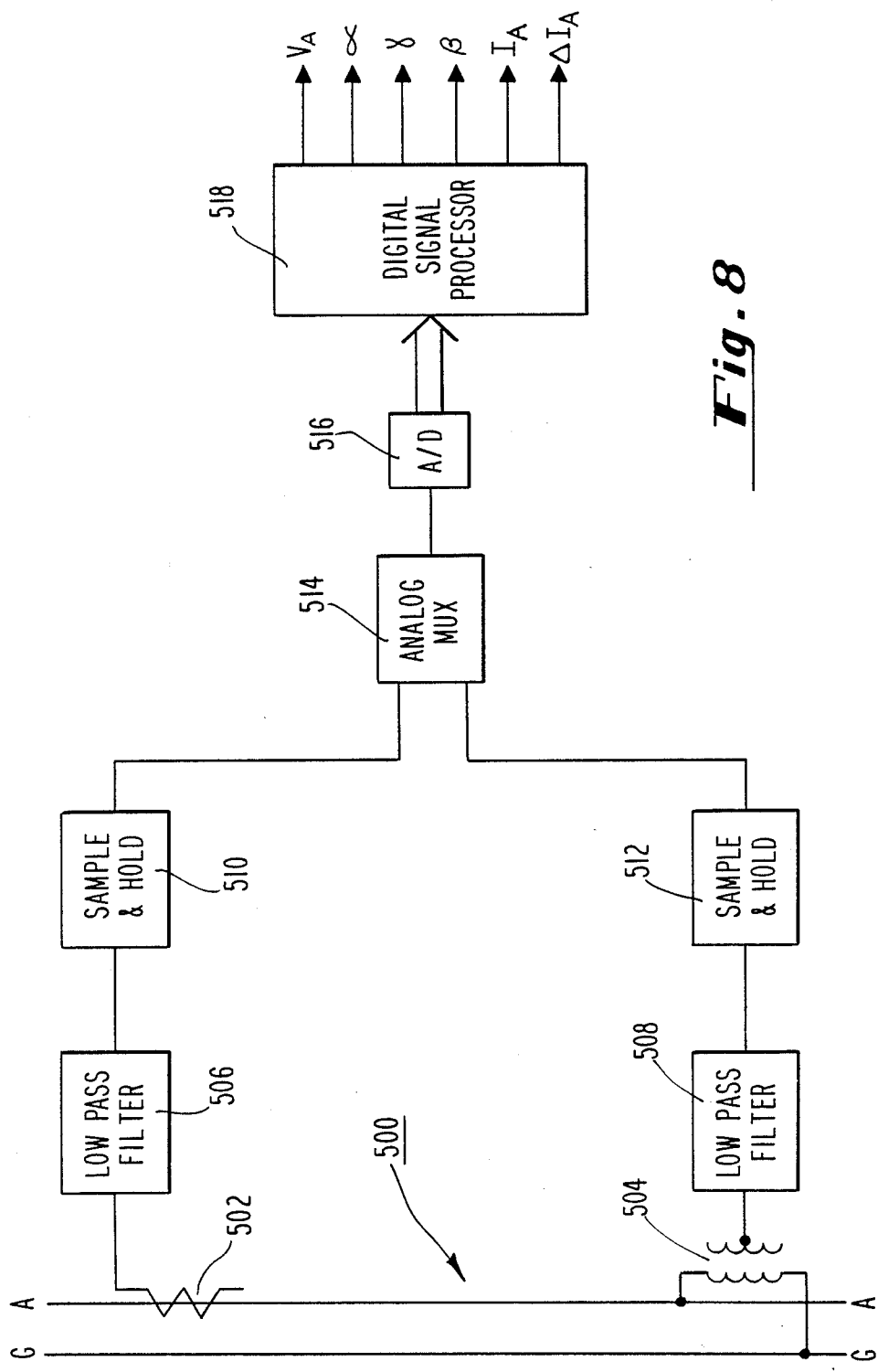
FIG. 8 is a one line, block diagram of an current and voltage processing portion of an alternate preferred embodiment of the present invention.

Referring now to FIG. 8, there is shown a current and voltage processing portion of an alternate preferred embodiment of the apparatus for providing distance protection and distance measurement for a high voltage transmission line in accordance with the present invention. The alternating current electric power transmission line is generally designated 500. As with the previous description, the following detailed description will be described with respect to the A phase (A) and ground (G) only for purposes of simplicity and clarity, realizing that alternating current electrical power transmission lines normally comprise three phases and ground. Consequently, it should be understood that the following description also applies with respect to the B phase and the C phase, as well as relays connected between phases.

Associated with the A phase is means 502 for sensing current in that phase as well as means 504 for sensing voltage on that phase. Such means are of the same type as those previously described and referred to as means 12 and means 14 respectively.

The output of the current sensing means 502, which is a signal $i_A(t)$ proportional to the current flowing in the A phase, is coupled to the input of a first low pass filter 506. The output of the voltage sensing means 504, which is a signal $v_A(t)$ proportional to the phase A to ground voltage, is coupled to the input of a second low pass filter 508. In the preferred embodiment, the first 506 and second 508 low pass filters are preferably of the same type as the first 16 and second 18 low pass filters previously described.

The output of the first low pass filter 506 is coupled to the input of a first sample and hold circuit 510. The output of the second low pass filter 508 is coupled to the input of a second sample and hold circuit 512. The first 510 and second 512 sample and hold circuits each sample the voltage at its input and holds the sample for a predetermined time at its output as is known in the art of analog circuit design.

The output of the first sample and hold circuit 510 is coupled to one input of a analog multiplexer 514. The output of the second sample and hold circuit 512 is coupled to a second input of the analog multiplexer 514. The analog multiplexer 5!4 samples the inputs and presents them to the output one at a time as is known in the art of analog circuit design. In the preferred embodiment, the analog multiplexer 514 is a type HI-508/HI-509 Single 8/Differential 4 Channel CMOS Analog Multiplexer manufactured by the Harris Semiconductor Company and described in pages 4-25 through 4-29 of the Harris Semiconductor Bulletin, which pages are incorporated by reference into the specification as fully set forth herein. The output of the analog multiplexer 514 is coupled to the input of an analog to digital converter 516. The analog to digital converter 516 is preferably of the same type as the previously described analog to digital converter 20 and the output of the analog to digital converter 516 is a digitized version of the analog input signal.

The output of the analog to digital circuit 516 is coupled to the input of a digital signal processor 518. The digital signal processor 518 is preferably a digital computer which is programmed to compute the discreet Fourier transform of the input signal. A preferred embodiment of such a digital signal processor is set forth in the book entitled "Digital Signal Processing", A. V.

Oppenheim and R. W. Shafer, published in 1975 by Prentise-Hall, Englewood Cliffs, N. J. and in particular chapter 6 of that book entitled "Computation of the Discreet Forney Transform".

The following digital signals are provided by the digital signal processor 518. $V_A$ which is a signal proportional to the phase A to ground voltage. $I_A$ which is a signal proportional to the phase A current. $\alpha$ which is a signal proportional to the phase angle between $V_A$ and $I_A$. $\gamma$ which is a signal proportional to the angle between $\Delta I_A$ and $I_A$ where $\Delta I_A$ is equal to the magnitude of the phase A current $I_A$ occurring at a second time period minus the magnitude of the phase A current $I_A$ occurring at a first time period, the second time period occurring later than the first time period. $\beta$ which is a signal which is proportional to the phase angle of the line impedance.

The signal $\Delta I_A$ can also be generated by the digital signal processor 518 as shown in FIG. 8. Alternatively, the signal $\Delta I_A$ can be generated using a buffer circuit and a subtraction circuit such as buffer circuit 24 and subtraction circuit 26 previously described with respect to FIG. 1.

Figure 9:
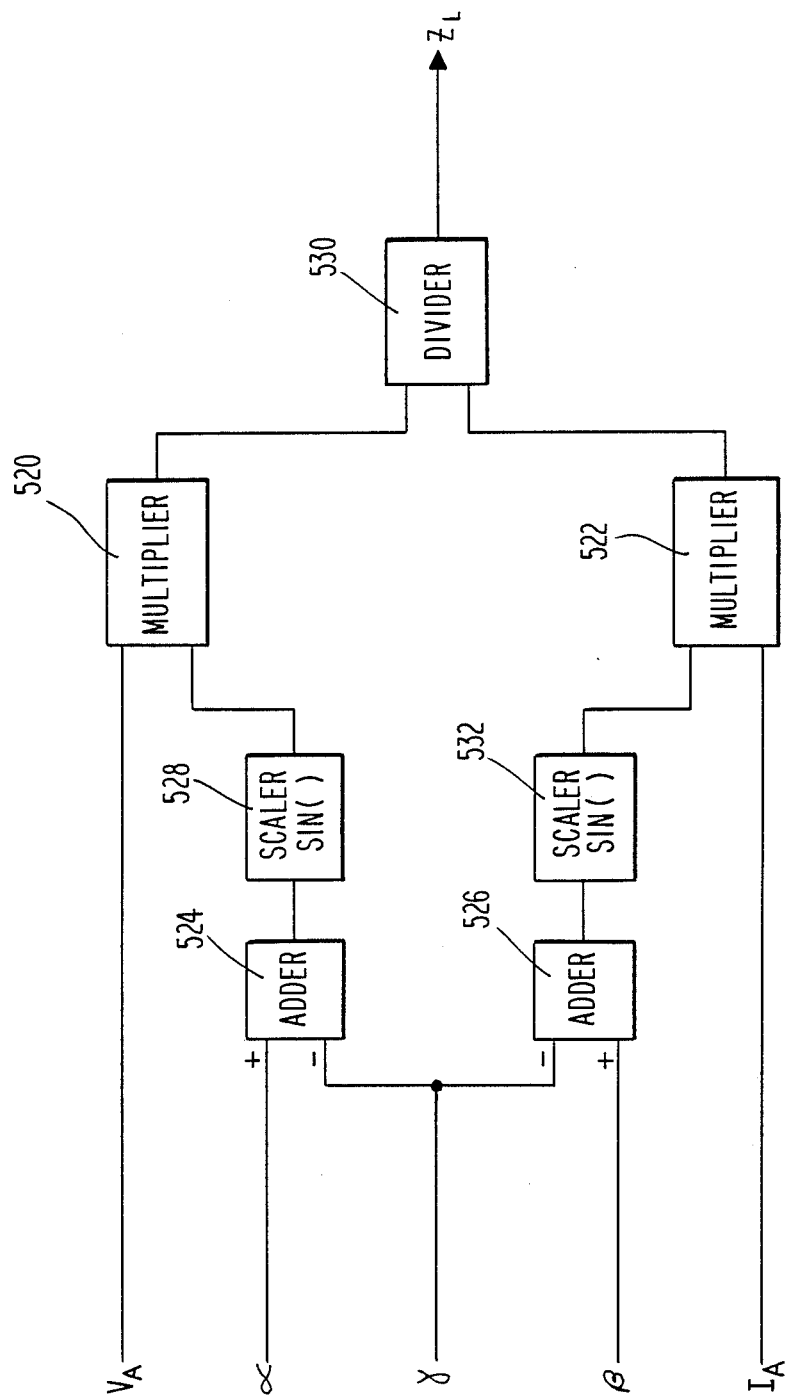
FIG. 9 is a block diagram of a distance impedance measurement portion of the alternate preferred embodiment of the present invention, utilizing voltage and current signals generated by that portion depicted in FIG. 8.

Referring now to FIG. 9, the output signal $V_A$ from the digital signal processor 518 (see FIG. 8) is coupled to one input of a first multiplier 520. The output signal $I_A$ of the digital signal processor 518 is coupled to one input of a second multiplier 522. As shown in FIG. 9, the signal $\alpha$, from the digital signal processor 518 is coupled to the positive input of a first two-input adder 524. The signal $\beta$, from the digital signal processor 518, is coupled to the positive input of a second two-input adder 526. The signal $\gamma$, from the digital signal processor 518, is coupled to the negative input of the first two-input adder 524 and the negative input of the second two-input adder 526. In the preferred embodiment, the first 524 and second 526 two-input adders are of the same type as the previously described two-input adder 26.

The output of the first two-input adder 524, is a signal $\alpha - \gamma$ which is proportion to the difference between the phase angle $\alpha$ and the phase angle $\gamma$. The signal is coupled to the input of a first scaler circuit 528. The first scaler circuit 528 is of the same type as the previously described first 30, second 36 and third 38 scaler circuits having an output which is equal to the magnitude of the input signal multiplied by the scaling function which, in the preferred embodiment, is equal to the sine function of the input quantity. Consequently, the output of the first scaler 528 is a signal which is proportional to sin($\alpha - \gamma$) which is coupled to a second input of the first multiplier 520. Since the inputs to the first multiplier 520 are the signals $V_A$ and sin($\alpha - \gamma$) the output of the first multiplier 520 is a signal proportional to $V_A\sin(\alpha - \gamma)$ and is coupled to a dividend input of a divider circuit 530. The divider circuit 530 provides an output signal which is proportional to the magnitude of the dividend input signal divided by the magnitude of the divisor input signal.

The output of the second adder circuit 526, which is a signal proportional to $\beta - \gamma$ is coupled to the input of a second scaler circuit 532. The second scaler circuit 532 is of the same type as the previously described first 30, second 36 and third 38 scaler circuits having an output which is equal to the magnitude of the input signal multiplied by the scaling function. Since the scale function for the second scaler circuit 532 is the sine function of the input quantity, the output signal from the second scaler circuit 532 is sin($\beta - \gamma$). This signal is coupled to a second input of the second multiplier circuit 522. Consequently, the output of the second multiplier circuit 522 is a signal proportional to $I_A\sin(\beta - \gamma)$ and is coupled to the divisor input of the divider circuit 128. Consequently, the output of the divider circuit 128 is a signal $Z_L$ which is equal to $$\frac{V_A\sin(\alpha - \gamma) \cdot}{I_A\sin(\beta - \gamma)}$$

The signal $Z_L$ is representative of the magnitude of the impedance of the transmission line within the reach of the relay.

Figure 10:
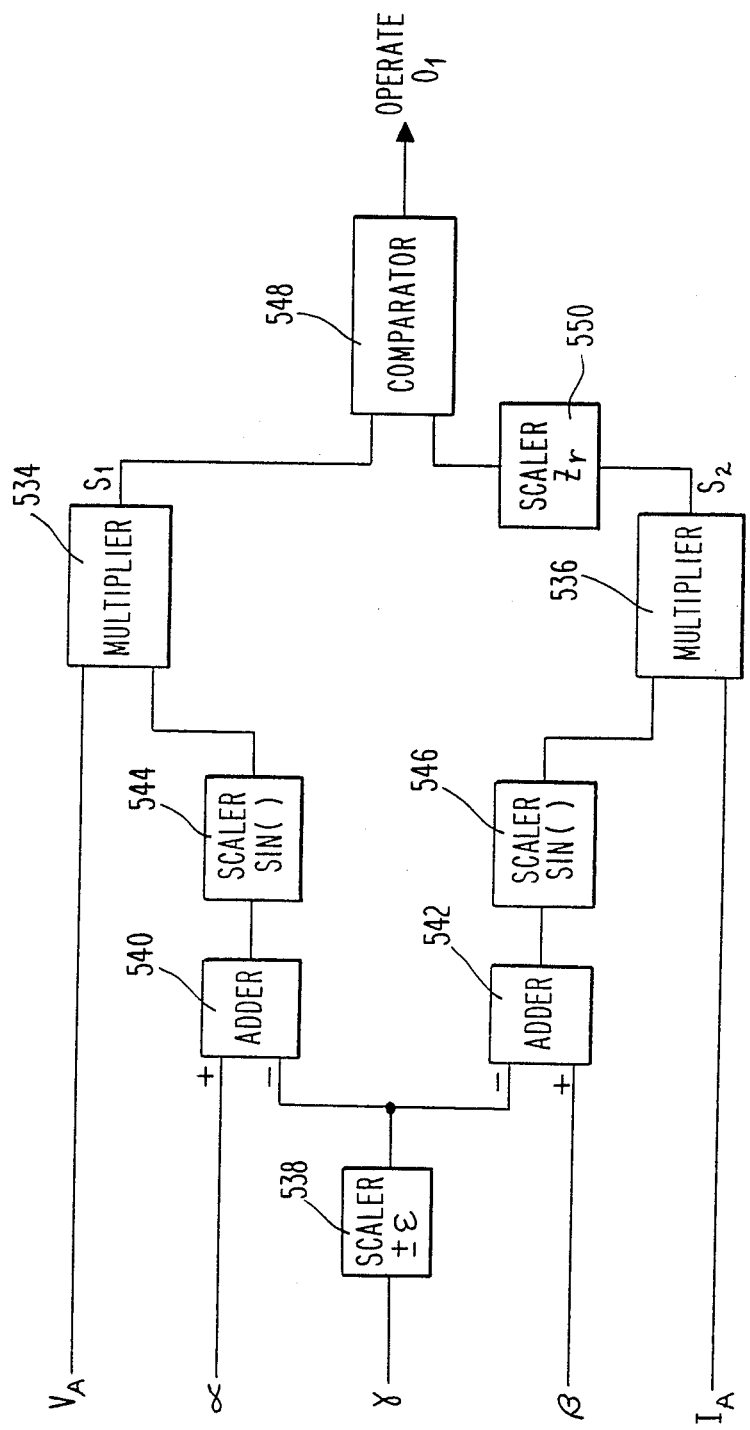
FIG. 10 is a block diagram of a distance protection portion of the alternate preferred embodiment of the present invention, utilizing voltage and current signals generated by that portion depicted in FIG. 8.

Referring now to FIG. 10, there is shown the distance protection, distance reach portion of the alternate preferred embodiment of the apparatus of the present invention. The output signal $V_A$ from the digital signal processor 518 (see FIG. 8) is coupled to one input of a third multiplier 534. The output signal $I_A$ from the digital signal processor 518 is coupled to one input of a fourth multiplier 536. In the preferred embodiment, the third 534 and fourth 536 multipliers are of the same type as the previously described multipliers for example first multiplier 48.

The signal $\gamma$ is coupled to the input of a third scaler circuit 538. The third scaler circuit 538 is of the same type as the previously described first and second scaler circuits 528 and 532. The output signal $\gamma'$ of the third scaler circuit 538 is equal to the input signal multiplied by a scale function which, for the third scaler 538, is the quantity $\pm \epsilon$ which is proportional to a predetermined "tilt" angle as previously described. The output of the third scaler 538 is coupled to the negative inputs of a third adder 138 and a fourth adder 140. In the preferred embodiment, the third adder 540 and fourth adder 542 are each of the same type as the previously described first 524 and second 526 adders (see FIG. 9).

The signal $\alpha$ from the digital signal processor 518 (see FIG. 8) is coupled to the positive input of the third adder 540. The signal $\beta$ from the digital signal processor 518 is coupled to the positive input of the fourth adder 542. The output of the third adder 540 is the signal $\alpha - \gamma'$ and is coupled to the input of a fourth scaler circuit 544. The output of the fourth adder 542 is the signal $\beta - \gamma'$ and is coupled to the input of a fifth scaler 546. The fourth 544 and fifth 546 scaler circuits are each of the same type as the previously described first 528 and second 532 scaler circuits (see FIG. 9), with each scaler having a scale factor which is proportional to the sine function of the input. Consequently, the output of the fourth scaler 544 is the signal sin($\alpha - \gamma'$) which is coupled to a second input of the third multiplier circuit 534. The output of the third multiplier circuit 534 is the signal $S_1$ which is equal to $V_A\sin(\alpha - \gamma')$ and is coupled to one input of a first two-input comparator 548.

The output signal from the fifth scaler 546 is the signal sin($\beta - \gamma'$) which is coupled to a second input of the fourth multiplier 536. The output of the fourth multiplier 536 is the signal $S_2$ which is equal to $I_A\sin(\beta - \gamma')$ and which is coupled to the input of a sixth scaler circuit 550. The sixth scaler circuit 550 is of the same type as the previously described scaler circuits but having a scale function $Z_r$ which is proportional to the impedance of the reach of the relay. Consequently, the output of the sixth scaler circuit 550 is a signal $Z_rI_A$-

$\sin(\beta - \gamma')$ or $Z_rS_2$ which is coupled to the second input of the two-input comparator 548.

The two-input comparator 548 compares the magnitude of the input signals $S_1$ and $Z_rS_2$ and generates an operate signal $O_1$ when the magnitude of $Z_rS_2$ is equal to or greater than the magnitude of the input signal $S_1$. The operate signal $O_1$ from the first two input comparator 548 is coupled to an AND gate as subsequently described with respect to FIG. 12.

Figure 11:
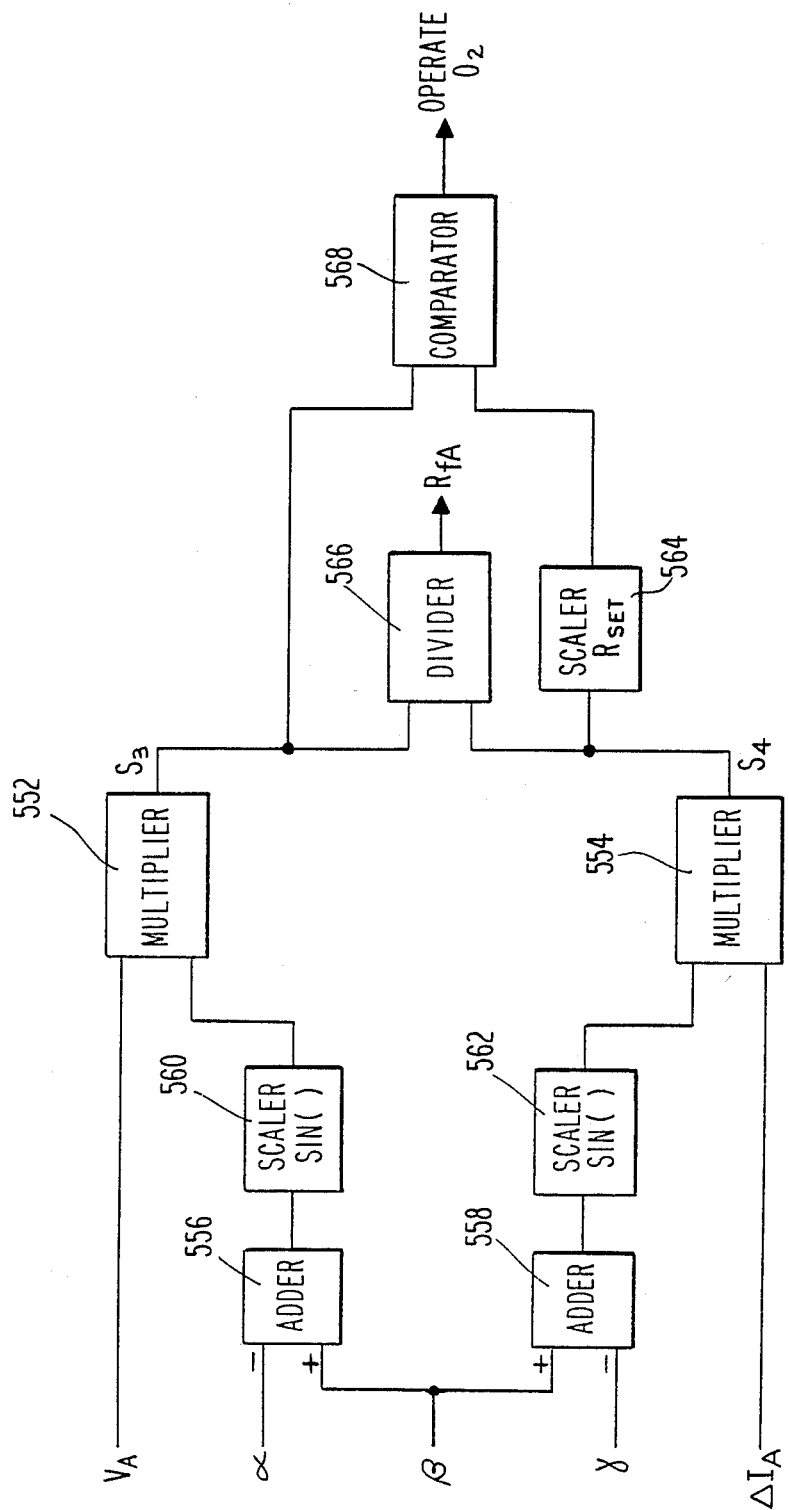
FIG. 11 is a block diagram of a distance protection, resistance reach and measurement portion of the alternate preferred embodiment of the present invention, utilizing voltage and current signals generated by that portion depicted in FIG. 8.

Referring now to FIG. 11, there is shown a block diagram of a distance protection, resistance reach and measurement portion of the alternate preferred embodiment of the apparatus of the present invention. The signal $V_A$ from the digital signal processor 518 (see FIG. 8) is coupled to one input of a fifth multiplier circuit 552. The signal $\Delta I_A$ which, as previously described, is equal to the magnitude of the $I_A$ signal sampled at a second time minus the magnitude of the $I_A$ signal sampled at a first, earlier time, is coupled to one input of a sixth multiplier circuit 554. In the preferred embodiment, the fifth and sixth multiplier circuits, 552 and 554, are of the same type as the previously described multiplier circuits for example the first multiplier circuit 520.

The signal $\alpha$ from the digital signal processor 518 is coupled to the negative input of a fifth adder circuit 556. The signal $\gamma$ from the digital signal processor 518 is coupled to the negative input of a sixth adder circuit 558. In the preferred embodiment, the fifth 556 and sixth 558 adder circuits are the same type as the previously described adder circuits 524 and 526 (see FIG. 9). The signal $\beta$ from the digital signal processor 518 is coupled to the positive inputs of the fifth adder circuit 556 and the sixth adder circuit 558.

The output of the fifth adder circuit 556, which is the signal $\beta - \alpha$, is coupled to the input of a seventh scaler circuit 560. The output of the sixth adder circuit 558, which is the signal $\beta - \alpha$, is coupled to the input of an eighth scaler circuit 562. In the preferred embodiment, the seventh 560 and eighth 562 scaler circuits are of the same type as the previously described scaler circuits, for example the first scaler circuit 528, in that the scale factor is a sine function of the input quantity. Consequently, the output of the seventh scaler circuit 560 is the signal $\sin(\beta - \alpha)$ which is coupled to a second input of the fifth multiplier 552. The output of the eighth scaler circuit 562 is a signal $\sin(\beta - \alpha)$ which is coupled to a second input of the sixth multiplier circuit 554.

The output signal $S_3$ from the fifth multiplier circuit 552, which is equal to $V_A\sin(\beta - \alpha)$, is coupled to the dividend input of a second divider circuit 566, and one input of a second two-input comparator circuit 568. In the preferred embodiment, the second divider circuit 566 is of the same type as the previously described first divider circuit 530 (see FIG. 9) having an output signal which is equal to the magnitude of the dividend input divided by the divisor input The second two-input comparator circuit 568 is of the same type as the previously described first two-input comparator circuit 548 (see FIG. 10).

The output signal $S_4$ from the sixth multiplier 554, which is equal to $\Delta I_A \sin(\beta - \alpha)$, is coupled to the divisor input of the second divider circuit 566 and the input of a ninth scaler circuit 564. The output signal $R_{fA}$ from the second divider 566 is therefore a signal which is equal to $$\frac{V_A\sin(\beta - \alpha)}{I_A\sin(\beta - \gamma)},$$

and is proportional to the magnitude of the resistance of that portion of the transmission line within the relay reach. In the preferred embodiment, the ninth scaler circuit 564 is of the same type as the previously described fifth scaler circuit 422 (see FIG. 4) in that the scale function is the quantity $R_{set}$ which is proportional to the desired resistance reach setting.

The output signal from the ninth scaler circuit 564, which is equal to $R_{set}\Delta I_A\sin(\beta - \gamma)$, or $R_{set}S_4$ is coupled to a second input of the second two-input comparator circuit 568. The second comparator circuit 568 generates an operate signal $O_2$, which is coupled to an AND gate as subsequently described with respect to Figure !2, when the magnitude of the signal $R_{set}S_4$ is equal to or greater than the magnitude of the signal $S_3$.

Figure 12:
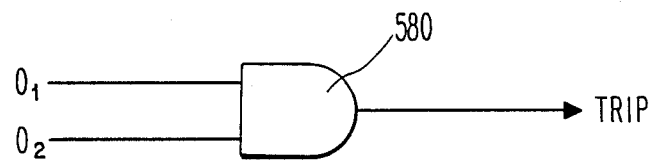
FIG. 12 is a block diagram of a trip signal generation portion of the alternate preferred embodiment of the present invention, utilizing the operate signals generated by that portion depicted in FIGS. 10 and 11.

Referring now to FIG. 12, the first operate signal $O_1$ is coupled to the first input of a two-input AND gate 580 and the second operate signal $O_2$ is coupled to the second input of the two-input AND gate 580. The output of the two-input AND gate 580 is a trip signal which is generated upon coincidence of the first operate signal $O_1$ and the second operate signal $O_2$. The trip signal is preferably utilized for enabling the operation of a circuit breaker or other transmission line interruption means.

The alternate preferred embodiment of the apparatus, as depicted in FIGS. 8, 9, 10 and 11 operates as follows. When there is no fault on a line, and the load remains substantially constant, the signal $\Delta I_A$ is equal to 0. Also, the phase angle $\gamma$ between $\Delta I_A$ and the phase current $I_A$ is also 0. Consequently, the signal $Z_L$ from the divider 530 (see FIG. 9) is equal to $$\frac{V_A\sin(\alpha)}{I_A\sin(\beta)}.$$

Since, as previously described, $\alpha$ is proportional to the phase angle between $V_A$ and $I_A$ and $\beta$ is proportional to the phase angle of the impedance, and since in this example it is assumed there is no fault on the line and the load remains substantially constant, the magnitude of $Z_L$ will be greater than the magnitude of $Z_{set}$ and an operate signal will not be generated from this portion of the system. Likewise, since $\gamma$ is 0 in this example, the signal $S_1$ in FIG. 10 is equal to $V_A\sin(\alpha)$ and the signal $S_2$ is equal to $Z_rI_A\sin(\beta)$. Under these no fault, no load change conditions, the quantity $$\frac{V_A\sin(\alpha)}{I_A\sin(\beta)}$$

will be greater than the quantity $Z_r$ and therefore this portion of the system will not generate an operate signal.

Referring to FIG. 11, $S_3$, in this example, will be equal to $V_A\sin(\beta)$; and $S_4$ will be equal to 0 since $\Delta I_A$ is 0. Consequently, the magnitude of the signal $S_3$ will be greater than the magnitude of the signal $S_4$ and the comparator 568 will therefore not generate an operate signal. Also, since the magnitude of the signal $S_4$ is 0, the magnitude of the signal $R_{fA}$ will be much larger than the signal $R_{set}$; therefore, this portion of the system will also not generate an operate signal.

Assuming now a fault on phase A, the signal $\Delta I_A$ will be equal to the fault current and the signal $\gamma$ will be proportional to the phase angle between the fault current and the prefault current. Since $\Delta I_A$ and $\gamma$ are no longer 0, the apparatus will generate an operate signal when the magnitude of $Z_L$; (see FIG. 9) is less than or equal to the magnitude of the signal $Z_{set}$. Similarly, the comparator 548 (see FIG. 10) will generate an operate signal when $V_A\sin(\alpha-\gamma')$ is less than or equal to the signal $Z_rI_A\sin(\beta-\gamma')$, or when the magnitude of the equal $S_1$ is less than or equal to the magnitude of the signal $S_2$ as shown in FIG. 10. Likewise, the comparator 568 will generate an operate signal when the signal $V_A\sin(\beta-\gamma)$ is less than or equal to the signal $R_{set}$-$\Delta I_A\sin(\beta-\gamma)$ or the magnitude of the signal $S_3$ is less than or equal to the magnitude of the signal $S_4$ shown in FIG. 11. Also, the system will generate an operate signal when the magnitude of the signal $R_{fA}$ is less than or equal to the magnitude of the signal $R_{set}$. This latter means that the A phase fault of this example has occurred within the resistance reach of the relay as set by the value of the constant $R_{set}$ as previously described.

When there is no fault on the line, but the load current changes, the signal $\Delta I_A$ will be equal to the magnitude of the change in load current. Likewise, the signal $\gamma$ will be proportional to the phase angle between the current after the load change and the current before the load change. However, the $Z_{set}$ and $R_{set}$ constants have been selected to ensure that there will be no outputs from the first 548 and second 568 comparators respectively for changes in load currents which are not due to faults within the reach of the relay. This can best be explained by reference to FIG. 13 which depicts the relay characteristic plotted on an L-R diagram. As can be seen, when either $V_A\sin(\alpha-\gamma')$ is greater than $Z_rI_A\sin(\beta-\gamma')$ or $V_A\sin(\beta-\gamma)$ is greater than $R_{set}$-$\Delta I_A\sin(\beta-\gamma)$ relay will not operate since the load current falls outside of the zone of operation shown in FIG. 13. However, when $Z_rI_A\sin(\beta-\gamma')$ is greater than or equal to $V_A\sin(\alpha-\gamma')$ and $R_{set}\Delta I_A\sin(\beta-\gamma)$ is greater than or equal to $V_A\sin(\beta-\alpha)$, the relay will operate since load characteristic falls within the zone of operation as shown in FIG. 13.

Figure 13:
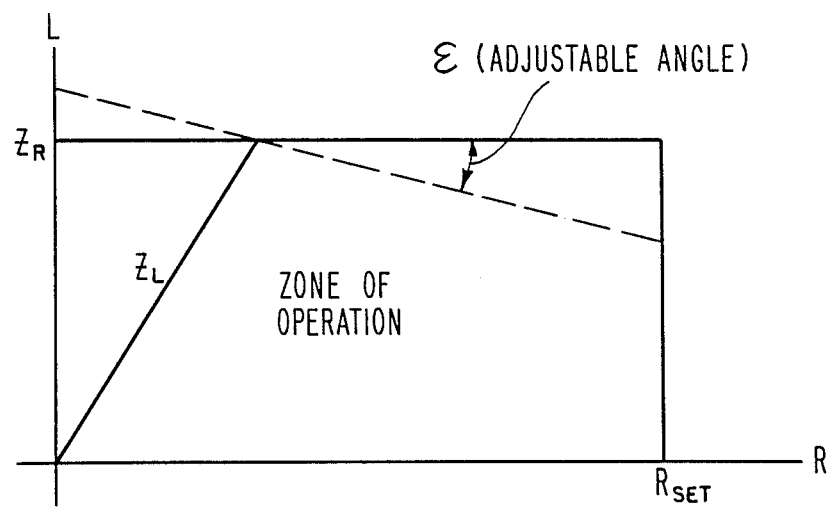
FIG. 13 depicts the characteristic of the alternate preferred embodiment of the relay of the present invention plotted on a L-R diagram.

As can be seen from the diagram of FIG. 13, the $Z_r$ line can be tilted (see dotted line) in order to provide a slope to the relay reach. This tilt angle $\epsilon$ is adjustable as provide by the scaler 538 (see FIG. 10).

As can be seen from the above description, the apparatus of the present invention has improved discrimination between internal/external faults thereby increasing the reliability of operation and the security of the protection system. Also, it can be seen that the system provides an accurate determination of the distance to the fault.

While the present invention has been described with reference to a specific embodiment thereof, it will be obvious to those skilled in the art that various changes and modifications may be made without departing from the invention in its broader aspects. It is contemplated in the appended claims to cover all variations and modifications of the invention that come within the true spirit and scope of my invention.

What is claimed is:

1. A protective relay for detecting faults in an electrical power distribution system, said relay comprising:
   (a) means for receiving signals from an electrical power distribution system, which signals relate to at least one system voltage v and at least one system current i;
   (b) means for generating a signal di/dt which is substantially equal to a first derivative with respect to time of said system current;
   (c) means for generating a signal $v_r$ which is substantially equal to the sum of a line resistance R of said power distribution system multiplied by said system current i and a line inductance L multiplied by said di/dt signal;
   (d) means for generating a signal $\Delta i$ which is substantially equal to the magnitude of the system current i measured at a first time subtracted from the magnitude of the system current i measured at a second time, said second time occurring later than said first time;
   (e) means for generating a signal $d\Delta i/dt$ which is substantially equal to a first derivative with respect to time of said $\Delta i$ signal;
   (f) means for generating a signal $i_f$ which is substantially equal to the sum of the signal $\Delta i$ plus the signal $d\Delta i/dt$ multiplied by a scaling function having a predetermined magnitude;
   (g) means for generating signals $v(t_1)$, $v_r(t_1)$ and $i_f(t_1)$ which are substantially equal to the magnitude of the signals v, $v_r$ and $i_f$ respectively occurring at a first time $t_1$;
   (h) means for generating signals $v(t_2)$, $v_r(t_2)$ and $i_f(t_2)$ which are substantially equal to the magnitude of the signals v, $v_r$ and $i_f$ respectively occurring at a second time $t_2$, which second time occurs later than said first time;
   (i) means for generating a signal $S_1$ which is substantially equal to the signal $V_r(t_1)$ multiplied by the signal $i_f(t_2)$ minus the signal $v_r(t_2)$ multiplied by the signal $i_f(t_1)$;
   (j) means for generating a signal $S_2$ which is substantially equal to the signal $v(t_1)$ multiplied by the signal $i_f(t_2)$ minus the signal $v(t_2)$ multiplied by the signal $i_f(t_1)$;
   (k) means for providing a signal $n_{set}$ having a predetermined magnitude; and
   (l) means for generating an output signal $O_1$ when the magnitude of the signal $n_{set}$ multiplied by the signal $S_1$ is greater than the magnitude of the signal $S_2$.

2. A protective relay in accordance with claim 1 additionally comprising:
   (a) means for generating a signal $\Delta i(t_1)$ which is substantially equal to the magnitude of the signal $\Delta i$ occurring at said first time $t_1$;
   (b) means for generating a signal $\Delta i(t_2)$ which is substantially equal to the magnitude of the signal $\Delta i$ occurring at said second time $t_2$;
   (c) means for generating a signal $S_3$ which is substantially equal to the signal $v_r(t_1)$ multiplied by the signal $\Delta i(t_2)$ minus the signal $v_r(t_2)$ multiplied by the signal $\Delta i(t_1)$;
   (d) means for generating a signal $S_4$ which is substantially equal to the signal $v(t_1)$ multiplied by the signal $\Delta i(t_2)$ minus the signal $v(t_2)$ multiplied by the signal $\Delta i(t_1)$; and
   (e) means for providing an output signal n which is substantially equal to the magnitude of the signal $S_4$ divided by the magnitude of the signal $S_3$.

3. The protective relay in accordance with claim 2 additionally comprising:
   (a) means for generating a signal $S_5$ which is substantially equal to the signal $v_r(t_2)$ multiplied by the signal $\Delta i(t_1)$ minus the signal $v_r(t_1)$ multiplied by the signal $\Delta i(t_2)$;

(b) means for generating a signal $S_6$ which is substantially equal to the signal $v(t_1)$ multiplied by the signal $v_r(t_2)$ minus the signal $v(t_2)$ multiplied by the signal $v_r(t_1)$;

(c) means for providing a signal $R_{set}$ having a predetermined magnitude; and (d) means for generating an output signal $O_2$ when the magnitude of the signal $R_{set}$ multiplied by the signal $S_5$ is greater than the magnitude of the signal $S_6$.

4. The protective relay in accordance with claim 3 additionally comprising:

(a) means for generating a signal $\Delta I_{pk}$ which is substantially equal to a peak magnitude of the signal $\Delta I$;

(b) means for providing a signal $V_{set}$ having a predetermined magnitude; and (c) means for generating an output signal when the magnitude of the signal $V_{set}$ multiplied by the signal $S_3$ is greater than the magnitude of the signal $\Delta I_{pk}$ multiplied by the signal $S_4$.

5. A protective relay for detecting faults in an electrical power distribution system, said relay comprising:

(a) means for receiving signals from an electrical power distribution system, which signals relate to at least one system voltage v an at least one system current i;

(b) means for generating a signal $\Delta i$ which is substantially equal to the magnitude of the system current i measured at a first time subtracted from the magnitude of the system current i measured at a second time, said second time occurring later than said first time;

(c) means for generating a signal $\alpha$ which is proportional to a phase angle between said system voltage v and said system current i;

(d) means for generating a signal $\beta$ which is proportional to a phase angle of a line impedance of said electrical power distribution system;

(e) means for generating a signal $\gamma$, which is proportional to a phase angle between said system current i and said signal $\Delta I$;

(f) means for generating a signal $\gamma'$ which is substantially equal to the signal $\gamma$ multiplied by a scaling function $\epsilon$ having a predetermined magnitude;

(g) means for generating a signal which is substantially equal to the sine function of the signal $\alpha$ minus the signal $\gamma'$;

(h) means for generating a signal which is substantially equal to a sine function of the signal $\beta$ minus the signal $\gamma'$;

(i) means for generating a signal $S_1$ which is substantially equal to said system voltage v multiplied by the sine function of the signals $\alpha$ minus $\gamma'$;

(j) means for generating a signal $S_2$ which is substantially equal to the system current i multiplied by the sine function of the signals $\beta$ minus $\gamma'$;

(k) means for providing a signal $Z_r$ having a predetermined magnitude; and (l) means for generating an output signal when the magnitude of the signal $Z_r$ multiplied by the signal $S_2$ is equal to or greater than the magnitude of the signal $S_1$.

6. The protective relay in accordance with claim 5 additionally comprising:

(a) means for generating a signal which is substantially equal to the sine function of the signal $\alpha$ minus the signal $\gamma$;

(b) means for generating a signal which is substantially equal to the sine function of the signal $\beta$ minus the signal $\gamma$;

(c) means for generating a first signal which is substantially equal to the magnitude of the signal v multiplied by the magnitude of the sine function of the signals $\alpha$ minus $\gamma$;

(d) means for generating a second signal which is substantially equal to the magnitude of the signal i multiplied by the magnitude of the sine function of the signals $\beta$ minus $\alpha$; and (e) means for providing an output signal $Z_L$ which is substantially equal to the magnitude of the first signal divided by the magnitude of the second signal 7. The protective relay in accordance with claim 6 additionally comprising:

(a) means for providing a signal which is substantially equal to the sine function of the signal $\beta$ minus the signal $\alpha$;

(b) means for providing a signal $S_3$ which is substantially equal to the magnitude of the signal v multiplied by the magnitude of the sine function of the signals $\beta$ minus $\alpha$;

(c) means for providing a signal $S_4$ which is substantially equal to the magnitude of the signal $\Delta i$ multiplied by the magnitude of the sine function of the signals $\beta$ minus $\gamma$;

(d) means for providing a signal $R_{set}$ having a predetermined magnitude; and (e) means for generating an output signal when the magnitude of the signal $R_{set}$ multiplied by the signal $S_4$ is greater than the magnitude of the signal $S_3$.

8. The protective relay in accordance with claim 7 additionally comprising means for generating a signal $R_{fA}$ which is substantially equal to the magnitude of the signal $S_3$ divided by the magnitude of the signal $S_4$.

9. An apparatus for measuring distance to a fault in an electrical power distribution system, said apparatus comprising:

(a) means for receiving signals from an electrical power distribution system, which signals relate to at least one system voltage v and at least one system current i;

(b) means for generating a signal $\Delta i$ which is substantially equal to the magnitude of the system current prior to the occurrence of a fault subtracted from the magnitude of the system current following occurrence of the fault;

(c) means for generating a signal $v_r$ which is substantially equal to a voltage measured across a line replica impedance;

(d) means for generating a signal $R_{fA}$ having an angle which is substantially equal to a fault resistance angle and (e) means for providing an output signal n which is related to the distance to the fault and which is substantially equal to the magnitude of the system voltage v minus the magnitude of the signal $\Delta i$ multiplied by the signal $R_{fA}$ divided by the signal $v_r$.

10. A distance relay responsive to the conditions of a fault on an alternating current power transmission line, said distance relay including means for measuring distance to a fault on said transmission line, said distance measuring means comprising:
- (a) means for receiving the signal which relate to a transmission line voltage v and a transmission line current i;
- (b) means for generating a signal Δi which is related to the magnitude of the transmission line current prior to occurrence of a fault on the transmission line subtracted from the magnitude of the transmission line current following occurrence of the fault;
- (c) means for generating a signal $v_r$ which is related to said transmission line current multiplied by a predetermined replica impedance; and
- (d) means for generating a signal n related to the distance to the fault, which signal is substantially equal to $$\frac{v(t_1) \Delta i(t_2) - v(t_2) \Delta i(t_1)}{v_r(t_1) \Delta i(t_2) - v_r(t_2) \Delta i(t_1)}$$

where $v(t_1)$, $v_r(t_1)$ and $\Delta i(t_1)$ are the signals v, $v_r$ and Δi occurring at a first time $t_1$, and $v(t_2)$, $v_r(t_2)$ and $\Delta i(t_2)$ are the signals v, $v_r$ and Δi occurring at a second time $t_2$ which is later than said first time $t_1$.

11. A distance relay in accordance with claim 10 additionally including variable distance reach means comprising:
- (a) means for establishing a predetermined minimum distance reach $n_1$;
- (b) means for establishing a predetermined maximum distance reach $n_2$;
- (c) means for generating a signal $S_{SETd}$ which is related to a variable distance reach;
- (d) means for generating a signal $ni_{pk}$ where $i_{pk}$ is substantially equal to a peak magnitude of the transmission line current i; and
- (e) means for generating a trip signal when n is less than or equal to $n_1$, or $ni_{pk}$ is less than or equal to $v_{SETd}$ and n is less than or equal to $n_2$.

12. A distance relay in accordance with claim 11 including means for generating a signal $R_{fA}$ which is substantially equal to $$\frac{v(t_1)v_r(t_2) - v(t_2)v_r(t_1)}{i(t_1)v_r(t_2) - i(t_2)v_r(t_1)}$$

and which is substantially in phase with the fault resistance.

13. A distance relay in accordance with claim 12 additionally including means for generating a variable resistance reach, said variable resistance reach means comprising:
- (a) means for generating a signal $R_{SET1}$ related to a predetermined minimum resistance reach;
- (b) means for generating a signal $\Delta i_{pk}$ which is related to a peak magnitude of the Δi signal;
- (c) means for generating a signal $V_{SETr}$ which is related to a variable resistance reach;
- (d) means for generating a signal $R_{SET2}$ which is related to a predetermined maximum resistance reach; and
- (e) means for generating a trip signal when the signal $R_{fA}$ is less than or equal to the signal $R_{SETa}$, or when the signal $\Delta i_{pk}$ multiplied by the signal $R_{fA}$ is less than the signal $V_{SET}$ and the signal $R_{fA}$ is less than or equal to the signal $R_{SET2}$.

14. A distance relay in accordance with claim 13 additionally including means for generating a signal $R_F$ related to the magnitude of fault resistance, which signal is substantially equal to $$R_{fA} \frac{\Delta i_A}{\Delta i_A + \Delta i_B}$$

where $\Delta i_B$ is related to magnitude of the system current i measured at a second end of the transmission line prior to occurrence of a fault subtracted from the magnitude of the system current measured at the second end of the transmission line following a occurrence of a fault.

15. A distance relay in accordance with claim 13 additionally including means for generating a signal $R_F$ related to the magnitude of the fault resistance, which signal is equal to $$\frac{R_{fA} \times R_{fB}}{R_{fA} + R_{fB}}$$

where $R_{fB}$ is related to the magnitude of the fault resistance measured at a second end of the transmission line, and having an angle which is substantially equal to the fault resistance angle.

* * * * *